(12) United States Patent
Yang et al.

(10) Patent No.: US 12,396,614 B2
(45) Date of Patent: Aug. 26, 2025

(54) TABLEWARE WASHING APPARATUS AND FILTERING DEVICE THEREOF

(71) Applicants: Guangdong Midea White Home Appliance Technology Innovation Center Co., Ltd., Foshan (CN); Foshan Shunde Midea Washing Appliances Mfg. Co., Ltd., Foshan (CN); Midea Group Co., Ltd., Foshan (CN)

(72) Inventors: Wenyong Yang, Foshan (CN); Weijun Xue, Foshan (CN); Seungjun Lee, Foshan (CN)

(73) Assignees: Guangdong Midea White Home Appliance Technology Innovation Center Co., Ltd., Foshan (CN); Foshan Shunde Midea Washing Appliances Mfg. Co., Ltd., Foshan (CN); Midea Group Co., Ltd., Foshan (CN)

( * ) Notice: Subject to any disclaimer, the term of this patent is extended or adjusted under 35 U.S.C. 154(b) by 422 days.

(21) Appl. No.: 18/089,384

(22) Filed: Dec. 27, 2022

(65) Prior Publication Data

US 2023/0135406 A1 May 4, 2023

Related U.S. Application Data

(63) Continuation of application No. PCT/CN2020/115686, filed on Sep. 16, 2020.

(51) Int. Cl.
*A47L 15/42* (2006.01)
*A47L 15/14* (2006.01)
(Continued)

(52) U.S. Cl.
CPC .......... *A47L 15/4206* (2013.01); *A47L 15/14* (2013.01); *A47L 15/4204* (2013.01);
(Continued)

(58) Field of Classification Search
CPC .. A47L 15/4206; A47L 15/14; A47L 15/4204; A47L 15/4208; A47L 15/4225;
(Continued)

(56) References Cited

U.S. PATENT DOCUMENTS

2016/0096196 A1* 4/2016 Papke ................. C09D 159/02
427/180
2016/0100738 A1 4/2016 Blanchard et al.
(Continued)

FOREIGN PATENT DOCUMENTS

CN 101558985 A 10/2009
CN 105286751 A 2/2016
(Continued)

OTHER PUBLICATIONS

Midea Group Co., Ltd., Chinese Office Action, CN Patent Application No. 202080018005.0, Jun. 3, 2024, 5 pgs.
(Continued)

*Primary Examiner* — Waqaas Ali
(74) *Attorney, Agent, or Firm* — Morgan, Lewis & Bockius LLP

(57) ABSTRACT

A filtering device and a tableware washing apparatus, the filtering device includes a rotary filter and a drive assembly. The rotary filter includes a columnar filtering screen configured to filter water from a washing process of the tableware washing apparatus; wherein a diameter of an external circle defined by each mesh of the columnar filtering screen is between 0.2 to 0.5 mm. The drive assembly is connected to the rotary filter and configured to drive the columnar filtering screen to rotate relative to contents within the
(Continued)

columnar filtering screen at a relative speed of 100 to 1000 r/min, for separating at least a portion of residue on the columnar filtering screen from the columnar filtering screen.

18 Claims, 19 Drawing Sheets

(51) Int. Cl.
*B01D 29/05* (2006.01)
*B01D 33/11* (2006.01)
*B01D 33/46* (2006.01)
*B01D 33/52* (2006.01)
*B01D 33/74* (2006.01)
*B01D 33/80* (2006.01)
*B01D 35/30* (2006.01)

(52) U.S. Cl.
CPC ....... *A47L 15/4208* (2013.01); *A47L 15/4225* (2013.01); *B01D 29/05* (2013.01); *B01D 33/11* (2013.01); *B01D 33/466* (2013.01); *B01D 33/52* (2013.01); *B01D 33/742* (2013.01); *B01D 33/801* (2013.01); *B01D 35/30* (2013.01)

(58) Field of Classification Search
CPC ...... B01D 29/05; B01D 33/11; B01D 33/466; B01D 33/52; B01D 33/742; B01D 33/801; B01D 35/30; B01D 29/23; B01D 29/86; B01D 2201/583; B01D 29/6476
See application file for complete search history.

(56) References Cited

U.S. PATENT DOCUMENTS

| | | |
|---|---|---|
| 2016/0150941 A1 | 6/2016 | Fountain et al. |
| 2017/0159228 A1 | 6/2017 | Lv et al. |

FOREIGN PATENT DOCUMENTS

| | | | |
|---|---|---|---|
| CN | 105342536 A | 2/2016 | |
| CN | 105534443 A | 5/2016 | |
| CN | 107242841 A | 10/2017 | |
| CN | 108577758 A | 9/2018 | |
| CN | 209301058 U | 8/2019 | |
| CN | 209377515 U | 9/2019 | |
| CN | 209377516 U | 9/2019 | |
| CN | 110881932 A | 3/2020 | |
| EP | 1386575 A1 * | 2/2004 | ......... A47L 15/4206 |
| KR | 20000003391 U | 2/2000 | |
| KR | 20100037453 A | 4/2010 | |
| WO | WO 2019168379 A1 | 9/2019 | |

OTHER PUBLICATIONS

Midea Group Co., Ltd., Extended European Search Report and Supplementary Search Report, EP20953602.8, Jun. 27, 2023, 17 pgs.
Midea Group Co., Ltd., ISRWO, PCT/CN2020/115686, Jun. 2, 2021, 14 pgs.
Midea Group Co., Ltd., IPRP, PCT/CN2020/115686, Mar. 21, 2023, 1 pgs.

* cited by examiner

TABLEWARE WASHING APPARATUS AND FILTERING DEVICE THEREOF

CROSS REFERENCE

The present disclosure is a continuation application of International (PCT) Patent Application No. PCT/CN2020/115686, filed on Sep. 16, 2020, the entire contents of which are hereby incorporated by reference in their entirety.

TECHNICAL FIELD

The present disclosure relates to the field of kitchen appliances, and in particular to a tableware washing apparatus and a filtering device.

BACKGROUND

In recent years, more and more consumers choose to use tableware washing apparatus. A filtration system is one of the core systems of a tableware washing apparatus, and the filtration system may ensure the filtering effect while saving energy.

In the related art, two means are adopted to improve the filtering effect of the filtration system: increasing the filtering area, and dividing a filtering screen into a coarse filtering screen and a fine filtering screen. Such means may be prone to clogging the filtering screen, resulting in unclean dishes. Therefore, the filtering effect of the filtration system may still not be guaranteed through the above means.

SUMMARY OF THE DISCLOSURE

The present disclosure provides a filtration device and a tableware washing apparatus having a filtration device.

A first aspect of the present disclosure provides a filtering device of a tableware washing apparatus, including: a rotary filter, including a columnar filtering screen configured to filter to water from a washing process of the tableware washing apparatus; wherein a diameter of an external circle defined by each mesh of the columnar filtering screen is between 0.2 to 0.5 mm; and a drive assembly, connected to the rotary filter and configured to drive the columnar filtering screen to rotate relative to contents within the columnar filtering screen at a relative speed of 100 to 1000 r/min, for separating at least a portion of residue on the columnar filtering screen from the columnar filtering screen.

A second aspect of the present disclosure provides a tableware washing apparatus, including: an inner liner; a spray arm, received in the inner liner; and the filtering device as above, received in the inner liner and communicated with the spray arm.

The present disclosure may improve the filtration performance and filtration effect of the filtering device by driving at least a portion of the rotary filter with a drive assembly to rotate the columnar filtering screen relative to the contents of the columnar filtering screen, and by setting the diameter of the outer circle defined by the mesh of the columnar filtering screen to collect the residue at the bottom of the columnar filtering screen and reduce the possibility of blocking the flow of water caused by the residue gathering on the filtering screen in the direction of the flow of to-be-filtered water. In addition, the water volume of the tableware washing apparatus may be increased when the water filtered by the filtering device is pumped to the inner liner, thereby reducing the washing time or the water used for a single washing, and may save energy.

BRIEF DESCRIPTION OF THE DRAWINGS

In order to more clearly illustrate the technical solutions in the embodiments of the present disclosure, the following is a brief description of the accompanying drawings to be used in the description of the embodiments. It is obvious that the accompanying drawings in the following description are only some of the embodiments of the present disclosure, and other accompanying drawings may be obtained on the basis of these drawings for those skilled in the art without creative labor.

DETAILED DESCRIPTION

The following will be a clear and complete description of the technical solutions in the embodiments of the present disclosure in conjunction with the accompanying drawings in the embodiments of the present disclosure. Obviously, the described embodiments are only a part of the embodiments of the present disclosure, and not all of them. Based on the embodiments in the present disclosure, all other embodiments obtained by those skilled in the art without creative labor fall within the scope of the present disclosure.

The terms "first" and "second" in the present disclosure are intended for descriptive purposes only, and are not to be construed as indicating or implying relative importance or implicitly specifying the number of technical features indicated. In the description of the present disclosure, "plurality" means at least two, such as two, three, etc., unless otherwise expressly and specifically limited. In addition, the terms "including" and "having", and any variations thereof, are intended to cover non-exclusive inclusion. For example, a process, method, system, product, or apparatus including a series of steps or units is not limited to the listed steps or units, but optionally further includes steps or units that are not listed, or optionally further includes other steps or units that are inherent to the process, method, product, or apparatus. The term "and/or" is simply a description of the associated relationship of associated objects, indicating that three relationships may exist, for example, A and/or B, which may mean: A alone, both A and B, and B alone. In addition, the character "/" in this specification generally indicates that the associated objects before and after "/" is in an "or" relationship.

Figure 1:
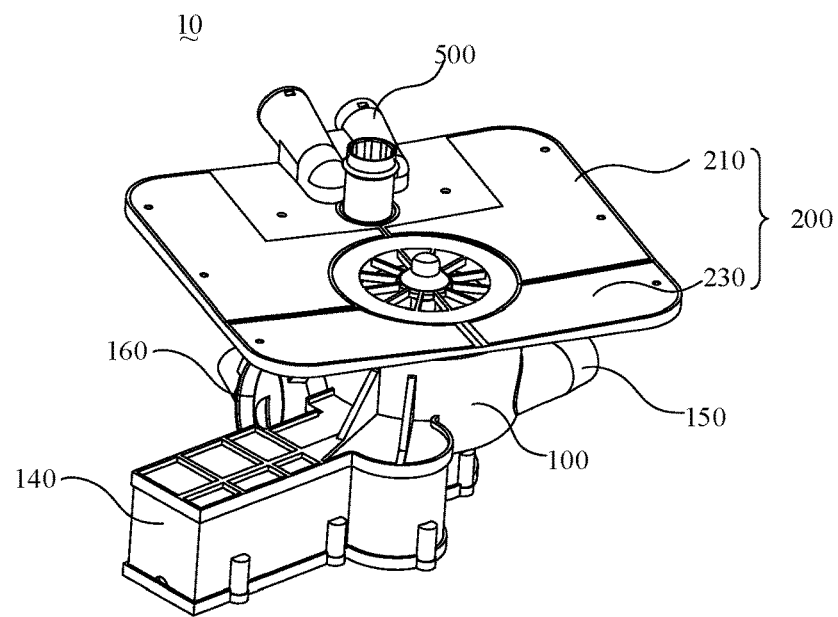
FIG. 1 is a perspective structural schematic view of a filtering device according to an embodiment of the present disclosure.
Figure 2:
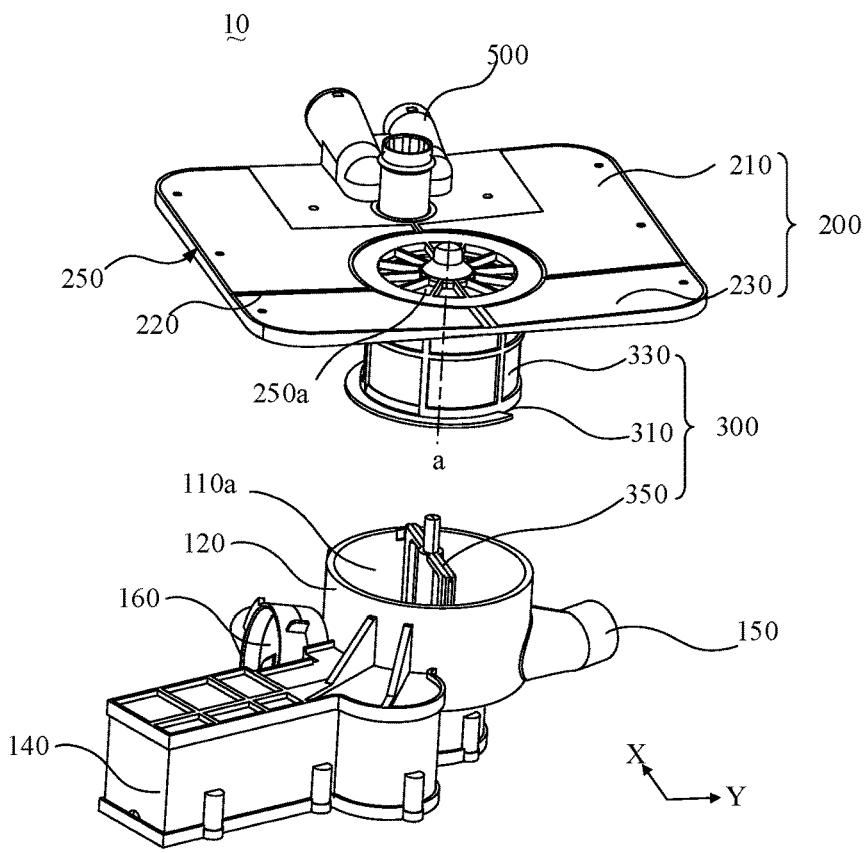
FIG. 2 is an exploded schematic view of the filtering device in FIG. 1.
Figure 32:
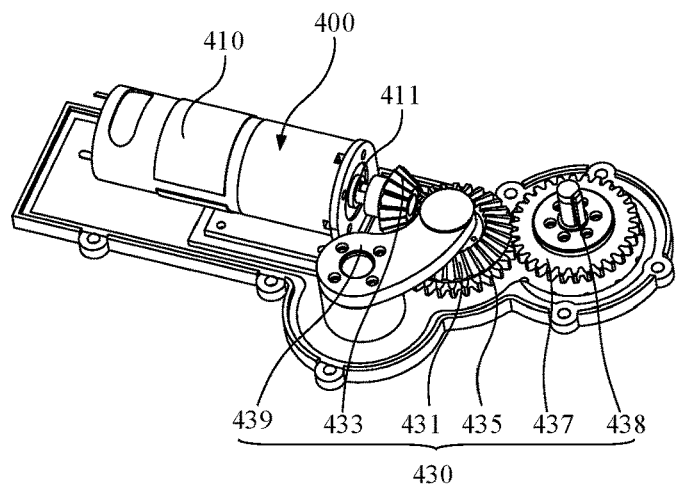
FIG. 32 is a cooperation relationship schematic view between a drive accommodating portion and a drive assembly according to an embodiment of the present disclosure.

As shown in FIGS. 1-2 and FIG. 32, embodiments of the present disclosure provide a filtering device 10 of a tableware washing apparatus. The filtering device 10 includes a water cup assembly 100, a plane filter 200 arranged on the water cup assembly 100, a rotary filter 300 at least partially inserted in the water cup assembly 100, and a drive assembly 400 connected to the rotary filter 300. Both the plane filter 200 and the rotary filter 300 are configured to filter water from a washing process of the tableware washing apparatus. The rotary filter 300 includes a columnar filtering screen 330. Therefore, the water can either be filtered by the plane filter 200 and out of the water cup assembly 100, or enter the columnar filtering screen 330 through an opening on the plane filter 200, filtered by the columnar filtering screen 330, and out of the water cup assembly 100. The drive assembly 400 is configured to drive/cause the columnar filtering screen 330 to rotate at a relative speed of 100 to 1000 r/min relative to contents in the columnar filtering screen 330 (components received in an internal space enclosed by the columnar filtering screen 330), for separating at least a portion of residue on the columnar filtering screen from the columnar filtering screen 330. In some embodiments, the drive assembly 400 may cause the columnar filtering screen 330 to rotate relative to the contents in the columnar filtering screen 330 at a relative speed of 150 to 700 r/min. The columnar filtering screen 330 rotating relative to the contents in the columnar filtering screen 330 herein means that the columnar filtering screen 330 rotates by itself driven by the drive assembly 400, or the contents in the columnar filtering screen 330 is rotatable driven by the drive assembly 400.

In some embodiments, the mesh count of meshes of the columnar filtering screen 330 is about 50 to 70 mesh. Specifically, the diameter of an external circle defined by each mesh of the columnar filtering screen 330 is about 0.2 to 0.5 mm, and the mesh spacing ranges from about 0.4 to 0.6 mm. In some embodiments, the diameter of the external circle defined by the mesh of the columnar filtering screen 330 is about 0.2 to 0.4 mm. In some embodiments, the diameter of the external circle defined by the mesh of the columnar filtering screen 330 may be 0.3 to 0.4 mm, and the mesh spacing may range from 0.6 to 1.0 mm. It can be understood that the mesh spacing herein may refer to a spacing between each adjacent meshes.

Conventionally, the filtering device 10 of the tableware washing apparatus may filter residues with a minimum particle size of about 0.3 mm. In the related art, a combination of coarse filtration and fine filtration is usually adopted for filtering, for example, a mesh aperture of 0.8 mm may be applied for coarse filtration, followed by a mesh aperture of 0.3 mm for fine filtration to improve the filtering effect. However, in the filtering process, the problem of mesh clogging still easily occurs, which causes a poor filtering effect.

To improve the filtering effect, in some embodiments of the present disclosure, the plane filter 200 and the rotary filter 300 are adopted to filter the water, and at least a portion of the rotary filter 300 is driven by the drive assembly 400 to rotate the columnar filtering screen 330 relative to the contents inside the columnar filtering screen 330 at a relative speed of 100 to 1000 r/min. The diameter of the external circle defined by the mesh of the columnar filtering screen 330 (hereinafter referred to as the "mesh aperture") is about 0.2 to 0.5 mm.

It is known from the related art that when the mesh aperture of the filtering screen is larger, more residue will leach out of the filtering screen, and therefore more residue may still be present in the filtered water. Therefore, in order to improve the filtering effect, the mesh aperture of the filtering screen is usually designed to be small. However, if the mesh aperture is too small, it is difficult to form an aggregation of the residue and the residue tends to block the mesh, causing trapped air. In addition, if the rotation speed of the filtering screen is too small when rotating the contents inside the columnar filtering screen 330 relative to the columnar filtering screen 330, water flow may be subjected to resistance, causing clogging. Therefore, a greater rotation speed of the filtering screen may be required when the mesh aperture is small, to mitigate the problem of difficult aggregation of residue and easy clogging. However, when the rotation speed of the filtering screen is too large, the residue tends to seep out of the filtering screen, resulting in poor filtering effect.

Therefore, in some embodiments of the present disclosure, the columnar filtering screen 330 is configured to rotate at a relative speed of 100 to 1000 r/min relative to the contents in the columnar filtering screen 330, and the mesh aperture diameter of the columnar filtering screen 330 is set to about 0.2-0.5 mm, such that while increasing the filtration area and improving the filtering speed, the residue can be gathered at the bottom of the columnar filtering screen 330, reducing the possibility of the residue collecting on the filtering screen in the direction of the water flow and blocking the flow of water, and also reducing the possibility of the residue leaking out of the filtering screen due to the excessive rotation speed of the filtering screen, thereby improving the filtering performance and filtering effect of the filtering device 10. In addition, it is possible to improve the water volume when the water filtered by the filtering device 10 is pumped through a pump to an inner liner of the tableware washing apparatus, thereby reducing the washing time or reducing the water used for a single washing, thus achieving energy saving and consumption reduction. In some embodiments, better filtering effect may be achieved by using the filtering device 10 mentioned in the present disclosure. In some embodiments, for example, a filtering effect of about 100% filtration may even be achieved when the diameter of the external circle defined by the mesh of the columnar filtering screen 330 is 0.3 mm and the columnar filtering screen 330 is rotated relative to the contents inside the columnar filtering screen 330 at a relative speed of 250 r/min.

Referring specifically to FIGS. 1-2 and 4-5, in some embodiments, a first opening 250a is defined on the plane filter 200, and the columnar filtering screen 330 of the rotary filter 300 is disposed below the first opening 250a. A second opening 110a is defined on the water cup assembly 100 facing and communicated with the first opening 250a, and a projection of an inner wall enclosing the first opening 250a on the water cup assembly 100 is located in the second opening 110a, thereby defining a return chamber 123a between the water cup assembly 100 and the columnar filtering screen 330 of the rotary filter 300. In this way, the water after the washing process can be filtered through the plane filter 200 and fall directly into the return chamber 123a; also, can fall through the first opening 250a into the rotary filter 300 and be filtered through the columnar filtering screen 330 of the rotary filter 300, and thereafter enter the return chamber 123a. The filtered water entering the return chamber 123a can be subsequently discharged through an outlet pipe 150 of the water cup assembly 100.

Figure 3:
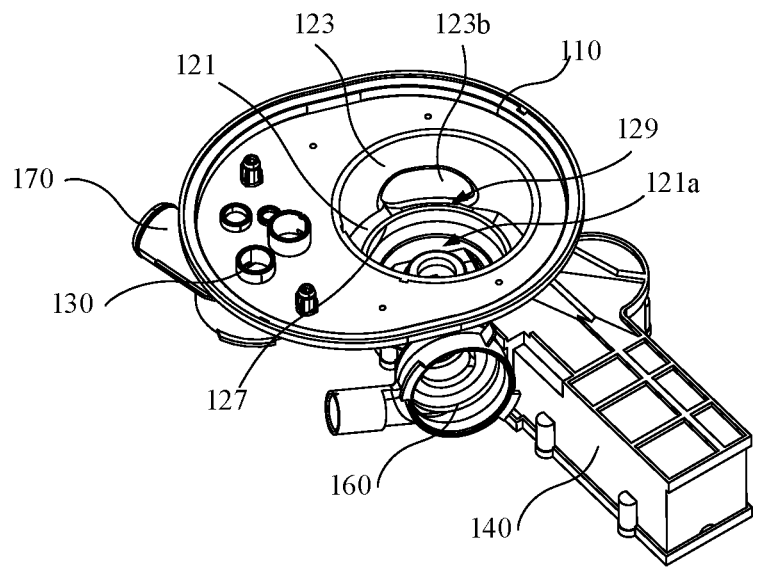
FIG. 3 is a perspective schematic view of a partial structure of the filtering device in FIG. 1 along a viewing angle direction.

Further referring to FIGS. 1-3, in some embodiments of the present disclosure, the water cup assembly 100 may include a tray 110, a cup 120 connected to the tray 110, a spray arm interface 130 arranged on the tray 110, and a drive accommodating portion 140, an outlet pipe 150, a discharge pump accommodating portion 160, and a water-extraction pump accommodating portion 170, each connected to the cup 120. The plane filter 200 is arranged on the tray 110, and the tray 110 is configured to collect the water filtered by the plane filter 200. The cup 120 is configured to accommodate the columnar filtering screen 330, and the drive accommodating portion 140 is configured to accommodate at least the motor 410 of the drive assembly (referring to FIG. 32). The outlet pipe 150 is communicated with the cup 120 such that the filtered water can be discharged through the outlet pipe 150. The discharge pump accommodating portion 160 is communicated with the cup 120 and is configured to accommodate a discharge pump (not shown) to discharge the residue from the cup 120 by the pumping action of the discharge pump. The water-extraction pump accommodating portion 170 is configured to accommodate a water-extraction pump (not shown). The water-extraction pump accommodating portion 170 is connected to the outlet pipe 150 through a line to transport the water in the cup 120 to the outside of the cup 120, specifically to the spray arm interface 130 on the tray 110, after being filtered by the columnar filtering screen 330, by the pumping action of the water-extraction pump.

Referring to FIGS. 6, 9 and 12-13, in some embodiments, the outlet pipe 150, the water-extraction pump accommodating portion 170, and the discharge pump accommodating portion 160 are spaced along a circumference of the cup 120. The water-extraction pump accommodating portion 170 is arranged adjacent to the outlet pipe 150 to reduce the loss of water flow. The discharge pump accommodating portion 160 is arranged on a side of the water-extraction pump accommodating portion 170 away from the outlet pipe 150 and is disposed at a junction position between the drive accommodating portion 140 and the cup 120, thereby reducing mutual interference between the residue discharge process and the water discharge process, and saving the installation space of each component. The "junction position" herein means that the discharge pump accommodating portion 160 is disposed at a corner position formed by the intersection of the drive accommodating portion 140 and the cup 120.

Figure 11:
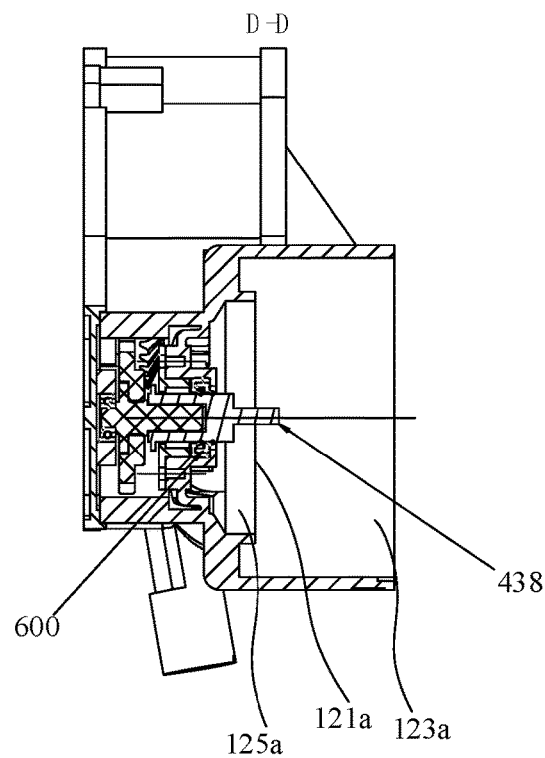
FIG. 11 is a cross-sectional schematic view of the filtering device along D-D in FIG. 6.

In some embodiments, the cup 120 may include a top surface and a bottom surface disposed opposite each other along an axial direction of the cup 120. The drive accommodating portion 140 does not protrude from a bottom surface of the cup 120 along the axial direction of the cup 120. In some embodiments, the drive accommodating portion 140 may not protrude from the top surface of the cup 120 along the axial direction of the cup 120. In some embodiments, referring to FIG. 2 and FIG. 11, the drive accommodating portion 140 may neither protrude from the top surface of the cup 120 nor protrude from the top surface of the cup 120 along the axial direction of the cup 120. With this structure, it is possible to add drive assemblies (e.g., including but not limited to the motor 410) without changing the original height of the washing apparatus, thereby saving space in the height direction and reducing the increase in the overall height of the washing apparatus due to installations of drive assemblies.

The "not protruding" herein means, in the axial direction, below the top surface, or above the bottom surface, or flush with the top or bottom surface. For example, in some embodiments, the drive accommodating portion 140 may likewise include a top surface and a bottom surface disposed opposite each other along the axial direction of the cup 120. In this case, the top surface of the drive accommodating portion 140 is disposed between the top surface and the bottom surface of the cup 120 in the height direction, or a bottom surface of the drive accommodating portion 140 is disposed between the top surface and the bottom surface of the cup 120 in the height direction, or the top surface of the drive accommodating portion 140 is flush with the top surface of the cup 120 in the height direction, or the bottom surface of the drive accommodating portion 140 is flush with the bottom surface of the cup 120 in the height direction.

With such a structure, the drive accommodating portion 140 does not protrude from the bottom surface of the cup 120 along the axial direction of the cup 120, such that a motor may be added without changing the original height of the filtering device 10, and the space along the height direction of the filtering device 10 may be saved, making the entire filtering device 10 more compact.

The "bottom surface" herein refers to an outer surface of the cup 120 away from the tray 110.

Of course, in some embodiments, the drive accommodating portion 140 may protrude at least partially from the bottom surface of the cup 120 along the axial direction of the cup 120. The ratio of the protruding height of the bottom surface of the drive accommodating portion 140 to the height of the motor is less than 1:1. With this structure, the drive accommodating portion 140 protrudes at least partially from the bottom surface of the cup 120 and the ratio of the protruding height to the height of the motor is less than 1:1, which may save space along the height direction of the filtering device 10 and makes the entire filtering device 10 more compact.

In some embodiments, the ratio of the protruding height of the bottom surface of the drive accommodating portion 140 relative to the bottom surface of the cup 120 to the height of the motor is less than 1:5 or even less than 1:7. In some embodiments, the ratio of the protruding height of the bottom surface of the drive accommodating portion 140 relative to the bottom surface of the cup 120 to the height of the motor is 1:16 to 1:5, and in other embodiments the ratio may be 1:12 to 1:7. For example, in some embodiments, the height of the motor may be 50 to 80 mm, or in some embodiments the height of the motor may be 70 mm. Accordingly, the protruding height of the drive accommodating portion 140 relative to the bottom surface of the cup 120 may be 5 to 10 mm. In some embodiments, the protruding height of the drive accommodating portion 140 relative to the bottom surface of the cup 120 may be 5 mm. Taking the above range, such as less than 1:5 or 1:7, etc., the protrusion height of the drive accommodating portion 140 and the motor arranged in the drive accommodating portion 140 may be further reduced, thereby further saving space along the height direction of the filtering device 10 and making the entire filtering device 10 more compact.

The "protruding height" herein refers to a distance between the bottom surface of the drive accommodating portion 140 and the bottom surface of the cup 120.

Figure 4:
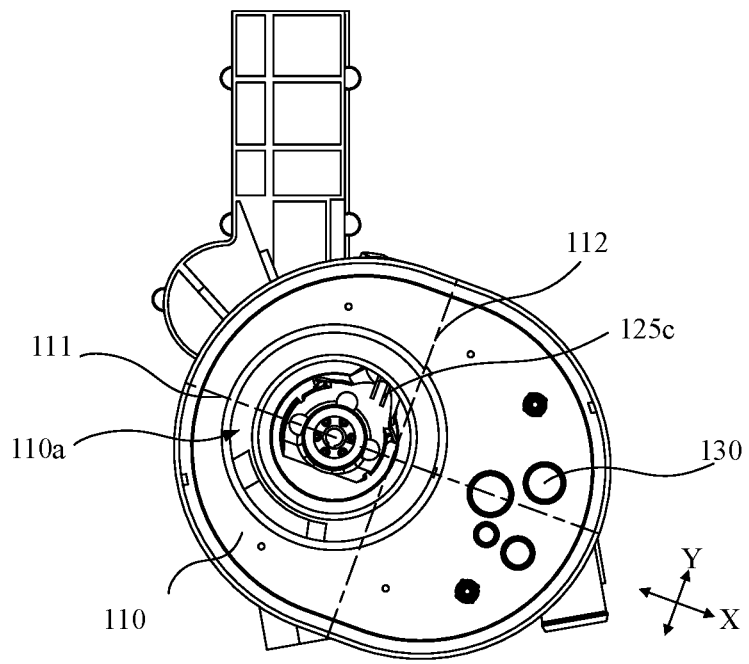
FIG. 4 is a plan schematic view of the partial structure of the filtering device in FIG. 3 along a viewing angle direction.

In some embodiments of the present disclosure, referring to specifically FIGS. 3-4, the tray 110 defines the second opening 110*a*, and the water collected by the tray 110 after being filtered by the plane filter 200 can fall through the second opening 110*a* to the bottom of the tray 110. The spray arm interface 130 is arranged on the tray 110, and the spray arm interface 130 and the second opening 110*a* are disposed at intervals along a first direction X.

In some embodiments, the tray 110 may be substantially elliptical in shape and have a long axis 111 and a short axis 112 that intersect with each other, where the long axis 111 may be set along the first direction X, i.e., the first direction X is the direction in which the long axis 111 of the tray 110 is located. The short axis 112 may be set in a second direction Y perpendicular to the first direction X, i.e., the second direction Y is the direction in which the short axis 112 of the tray 110 is located. In some embodiments, the ratio of the length of the long axis 111 and the short axis 112 may be 5:3, which may facilitate the arrangement of the spray arm interface 130 and increase the water-passing area when filtering, such that most of the water after washing can fall into the rotary filter 300 through the first opening 250*a* on the plane filter 200, and enter the return chamber 123*a* after being filtered by the columnar filtering screen 330, or enter directly into the return chamber 123*a* filtered by the plane filter 200.

In some embodiments of the present disclosure, the tray 110 is elliptical. Of course, in other embodiments, the tray 110 may be configured in other shapes, such as round, square, rectangular, diamond-shaped, etc., as long as the tray 110 has enough space to arrange the spray arm interface 130 and define the second opening 110*a* and can carry the plane filter 200.

In some embodiments of the present disclosure, the cup 120 is substantially columnar in shape. The columnar filtering screen 330 of the rotary filter 300 may be accommodated in the cup 120, and a gap exists between an inner surface of the cup 120 and an outer surface of the columnar filtering screen 330. The ratio of an inner diameter of the cup 120 to an inner diameter of the columnar filtering screen 330 is about 3:4 to 8:9, and the width of the gap between the inner surface of the cup 120 and the outer surface of the columnar filtering screen 330 along a radial direction of the cup 120 is about 10 to 20 mm. In some embodiments, the height of the cup 120 is about 90 to 110 mm, the inner diameter of the cup 120 is about 80 to 100 mm, and the inner diameter of the columnar filtering screen 330 is about 60 to 80 mm. This size design may effectively reduce the problem of air extraction during the water return process, ensure the smooth flow of water such that the water can fill the return chamber 123*a*, reduce the possibility of air adulteration in the return chamber 123*a*, thereby ensuring the flow of the washing process and improving the filtration performance.

Figure 5:
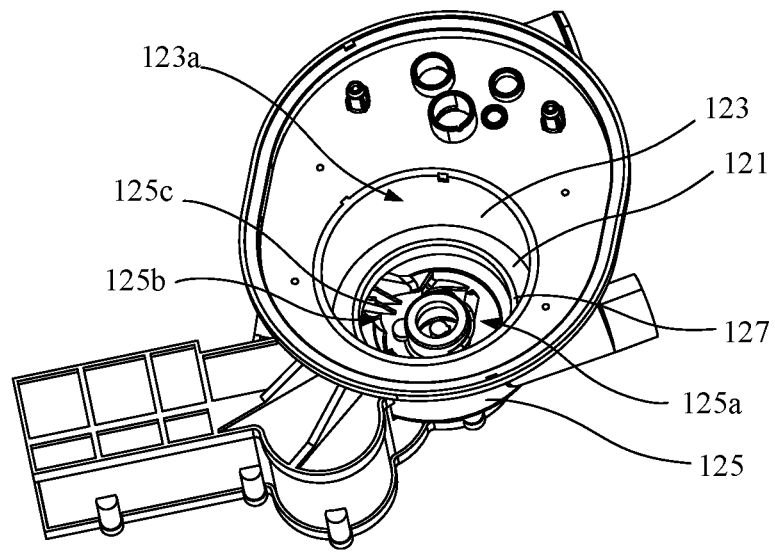
FIG. 5 is a perspective schematic view of the partial structure of the filtering device in FIG. 3 along another viewing angle direction.

Referring further to FIGS. 3-5, the cup 120 may substantially include a bottom wall 121 and a first peripheral wall 123 and a second peripheral wall 125 that are connected to the bottom wall 121. The first peripheral wall 123 and the second peripheral wall 125 are connected to opposite sides of the bottom wall 121, respectively. That is, the first peripheral wall 123 is connected to a side of the bottom wall 121, and the second peripheral wall 125 is connected to the other side of the bottom wall 121 opposite to the side of the bottom wall 121. That is, the first peripheral wall 123 extends toward a side of the bottom wall 121, and the second bottom wall 125 extends toward the other side of the bottom wall 121. The first peripheral wall 123 encloses a receiving cavity (not shown) for receiving the columnar filtering screen 330. The columnar filtering screen 330 may be received in the receiving cavity, and the columnar filtering screen 330 may divide the receiving cavity into a filtration chamber for receiving the water inside the columnar filtering screen 330 and the return chamber 123a disposed outside the columnar filtering screen 330. The first peripheral wall 123 further defines a first water outlet 123b, and the outlet pipe 150 is connected to the return chamber 123a through the first water outlet 123b. The second bottom wall 125 may enclose a discharge cavity 125a, and the second bottom wall 125 may further define a discharge outlet 125b. The discharge pump accommodating portion 160 is communicated with the discharge cavity 125a through the discharge outlet 125b. In conjunction with FIG. 11, the bottom wall 121 may further define a through hole 121a, and the receiving cavity and the discharge cavity 125a are communicated with each other through the through hole 121a.

In some embodiments, the first peripheral wall 123 and the second peripheral wall 125 may each be an annular peripheral wall. Of course, in other embodiments, the first peripheral wall 123 and the second peripheral wall 125 may also be other shapes.

The first peripheral wall 123 and the second peripheral wall 125 may be integrally formed into one part, or separately formed, which is not limited herein.

Referring further to FIGS. 3-5, the cup 120 may further include a support tab 127, which is connected to the bottom wall 121 and extends from the bottom wall 121 toward the receiving cavity. The support tab 127 is arranged around the through hole 121a. In some embodiments of the present disclosure, the inner surface of the columnar filtering screen 330 may be abutted against an outer surface of the support tab 127, to support the columnar filtering screen 330 on the support tab 127. The support tab 127 may be configured to support the columnar filtering screen 330 and may serve as a retaining wall to prevent the residue falling into the discharge cavity 125a from adhering to the columnar filtering screen 330 again by the action of flowing water.

The "supported on" herein may be understood to mean that the support tab 127 only serves as a support, not as a fixing part. Therefore, the columnar filtering screen 330 may be fixed to the support tab 127 or not be fixed. For example, the columnar filtering screen 330 may be rotated relative to the support tab 127.

After the filtered water has been filtered through the columnar filtering screen 330, the water seeps out of the columnar filtering screen 330 into the return chamber 123a and is delivered to the outside of the cup 120 through the first water outlet 123b. In this case, at least a portion of the residue falls into the discharge cavity 125a and is discharged through the pumping action of a discharge pump to the outside of the cup 120 through the discharge outlet 125b.

In some embodiments, the discharge outlet 125b is defined at the bottom of the cup 120. In some embodiments, the discharge outlet 125b is defined at a lowest position at the bottom of the cup 120 to facilitate the collection and discharge of the residue. In addition, referring to FIG. 12, an angle α between a line connecting the center of the discharge outlet 125b and the center of the cup 120 and a line connecting the center of the first water outlet 123b and the center of the cup 120 is greater than 90 degrees and less than or equal to 180 degrees. In some embodiments, the angle may be 180 degrees, in which case the discharge pump accommodating portion 160 and the outlet pipe 150 are arranged along the radial direction of the cup 120 on opposite sides of the cup 120.

In order to facilitate the discharge of the residue, in some embodiments of the present disclosure, further referring to FIG. 5, at least one guiding element 125c may be arranged inside the discharge cavity 125a. The at least one guiding element 125c is arranged adjacent to the discharge outlet 125b for guiding the residue during the discharge of the residue from the cup 120.

Figure 9:
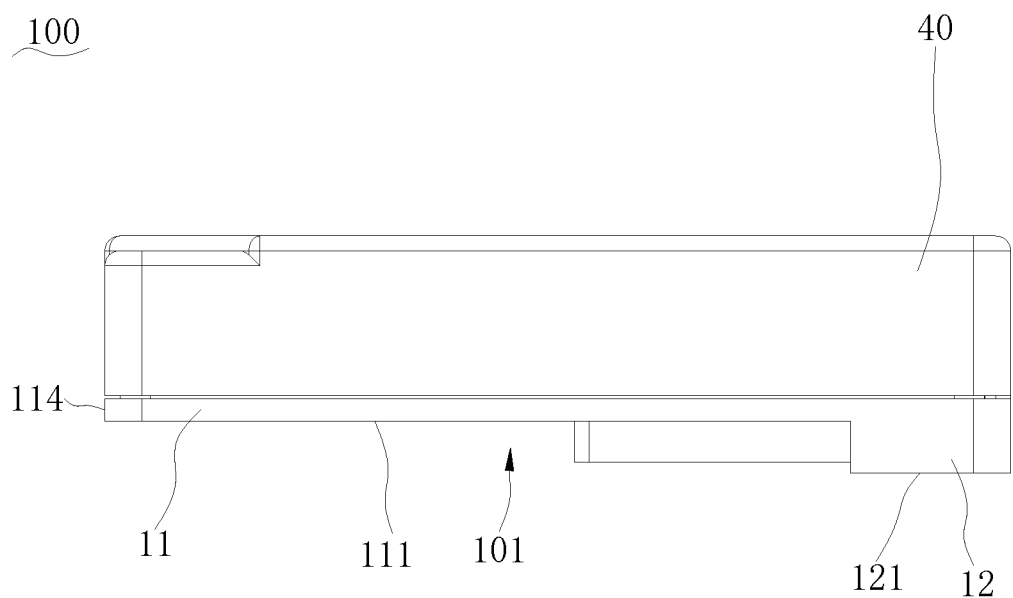
FIG. 9 is a perspective schematic view of the partial structure of the filtering device in FIG. 3 along another viewing angle direction.
Figure 10:
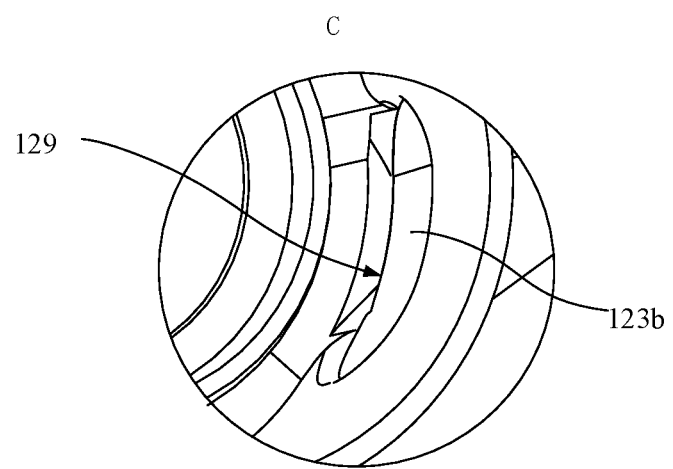
FIG. 10 is an enlarged schematic view of area C circumscribed in FIG. 9.

Referring further to FIG. 3 and FIGS. 9-10, in some embodiments, a recess 129 is defined on the bottom wall 121 toward the receiving cavity, and the recess 129 is arranged adjacent to and communicated with the first water outlet 123b. The recess 129 is further communicated with the return chamber 123a. The provision of such a recess 129 at a position adjacent to the first water outlet 123b may effectively solve the problem of pumping air when pumping water through the pump subsequently, such that the water can adequately fill an outlet region of the cup 120 without mixing with air and ensuring the flow of water during the subsequent washing process.

Figure 13:
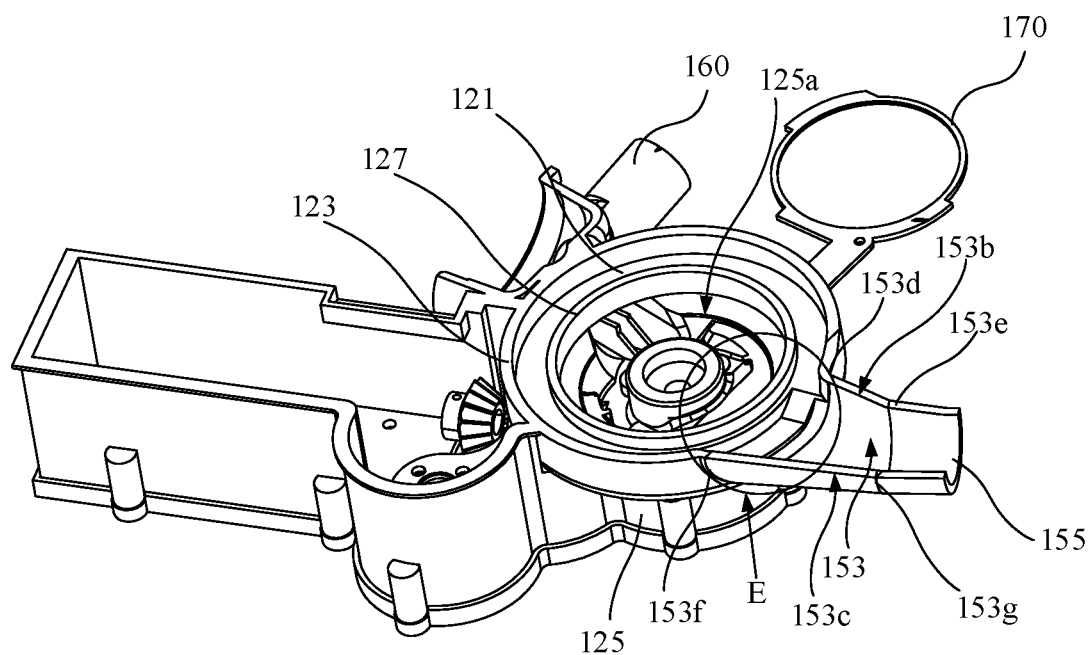
FIG. 13 is a cross-sectional schematic view of a partial structure of a filtering device according to an embodiment of the present disclosure.
Figure 14:
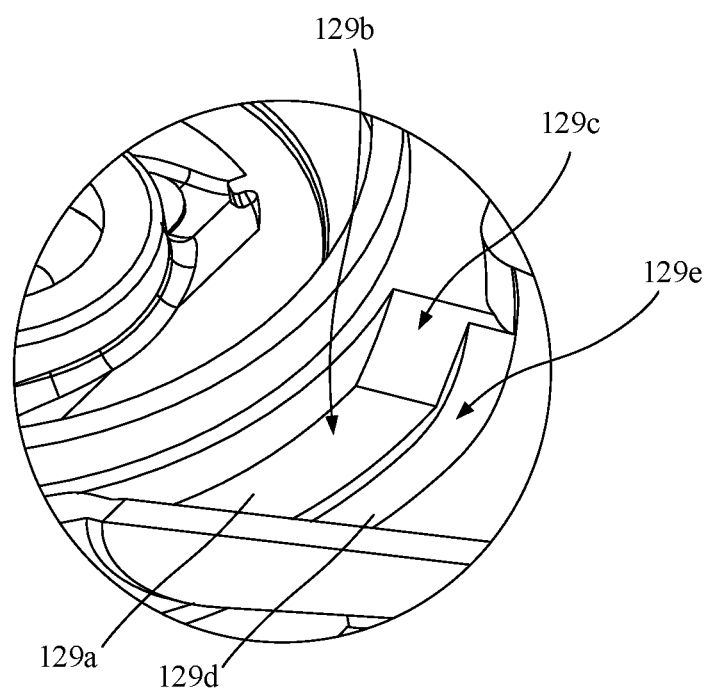
FIG. 14 is an enlarged schematic view of area E circumscribed in FIG. 13.

In some embodiments, in conjunction with FIGS. 13-14, the recess 129 may be disposed between the first peripheral wall 123 and the support tab 127.

Figure 12:
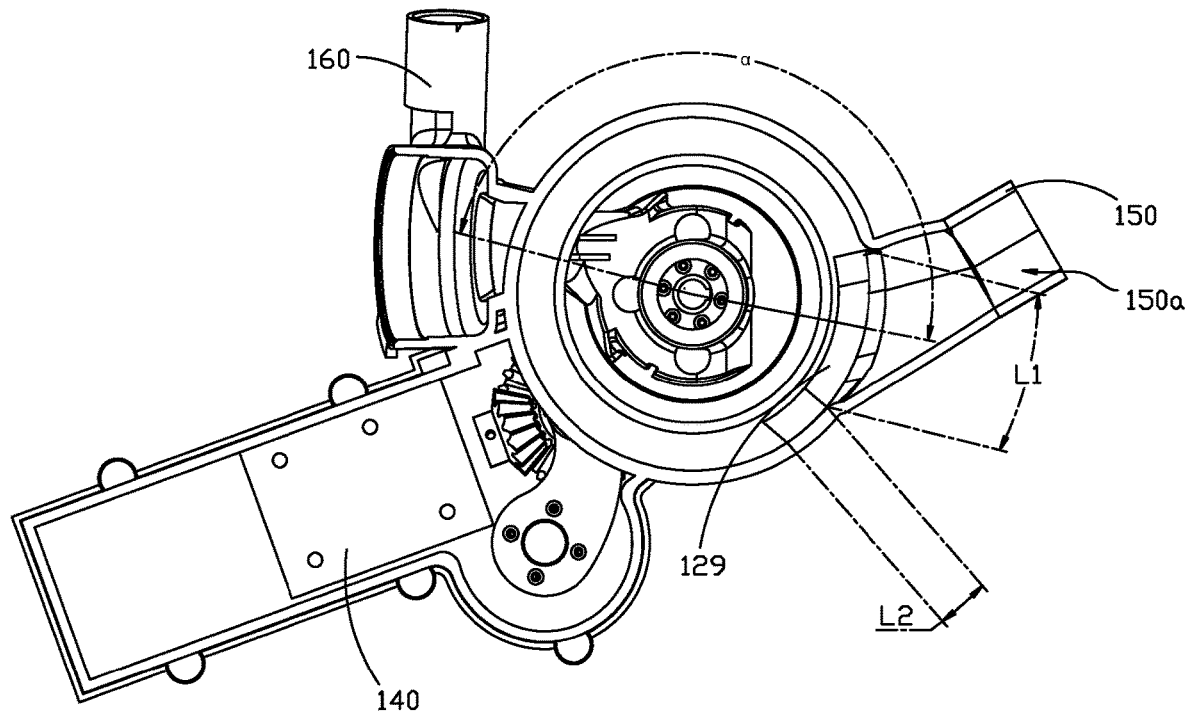
FIG. 12 is a cross-sectional schematic view of a partial structure of a filtering device according to an embodiment of the present disclosure.

In some embodiments, referring to FIG. 12, the recess 129 may extend along a circumference of the cup 120 for a length greater than the length of the first water outlet 123b along the circumference of the cup 120, thereby ensuring that filtered water can sink to the recess 129 and flow out of the cup 120 in a timely manner through the first water outlet 123b. In this way, the filtered water can fill the outlet region of the cup without air in the process of pumping water through the pump, which can effectively reduce the probability of trapped air in the pump.

Figure 6:
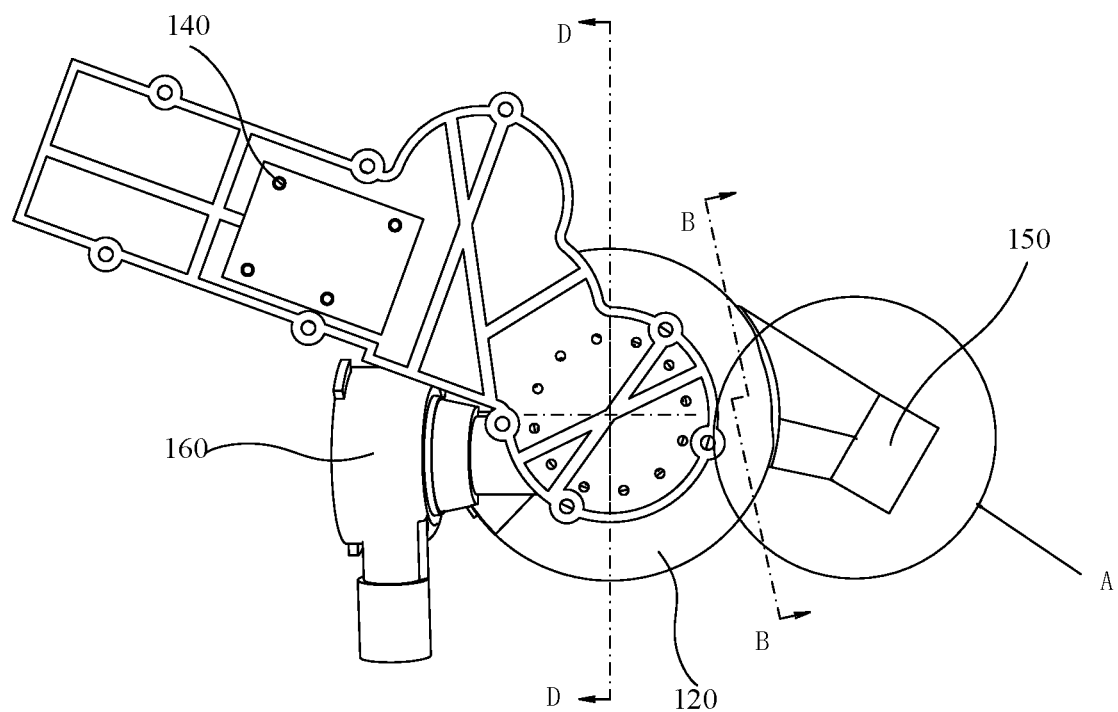
FIG. 6 is a plan schematic view of the partial structure of the filtering device in FIG. 3 along another viewing angle direction.

In some embodiments of the present disclosure, referring to FIG. 6 and FIGS. 13-14, the recess 129 may include a first recess portion 129a and a second recess portion 129d that are from inside to outside sequentially arranged along the radial direction of the cup 120. The first recess portion 129a has a first bottom surface 129b and the second recess portion 129d has a second bottom surface 129e. A recessed depth of the second bottom surface 129e relative to the bottom wall 121 is greater than a recessed depth of the first bottom surface 129b relative to the bottom wall 121. The "recessed depth" herein means a vertical distance (i.e., the distance along the axial direction of the cup 120) between the bottom surface (i.e., the first bottom surface 129b or the second bottom surface 129e) of the corresponding recess portion (first recess portion 129a or second recess portion 129d) and the bottom wall 121. In some embodiments, the difference between the recessed depth of the first recess portion 129a and the recessed depth of the second recess portion 129d is about 5 to 8 mm. The design of two levels of recess portions to form the recess 129 may facilitate the injection molding process of the cup 120 and reduce the possibility of shrinkage and deformation of the recess 129 during the injection molding process of the cup 120.

Further referring to FIGS. 13-14, in some embodiments, the recessed depth of the second bottom surface 129e relative to the bottom wall 121 may be further less than a recessed depth of a lowest point of an inner wall of the outlet pipe 150 at the first water outlet 123b relative to the bottom wall 121, thereby reducing the probability of trapped air during subsequent pumping, such that the water can adequately fill the outlet region of the cup 120 without mixing with air, ensuring the water flow of the washing process.

In addition, in some embodiments, the first recess portion 129a has an inclined surface 129c connecting the bottom wall 121 and the first bottom surface 129b. In some embodiments, an angle between the inclined surface 129c and the first bottom surface 129b is about 158.9° to 162.7°. The first recess portion 129a is set with an inclined surface, which allows the filtered water to smoothly transitioned into the recess 129 through the inclined surface 129c and flow into the outlet pipe 150 through the first water outlet 123b and then out of the cup 120.

Figure 7:
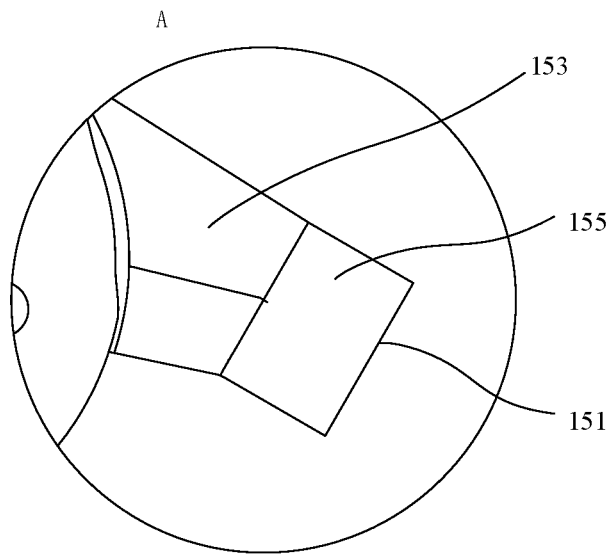
FIG. 7 is an enlarged schematic view of area A circumscribed in FIG. 6.

In some embodiments, referring to FIGS. 7, 9 and 12, an end of the outlet pipe 150 is connected to the cup 120 and communicated with the return chamber 123a through the first water outlet 123b. The other end of the outlet pipe 150 is arranged with a second water outlet 151, and the outlet pipe 150 defines an outlet channel 150a between the first water outlet 123b and the second water outlet 151. The cross-sectional area of the outlet channel 150a decreases in a direction from the first water outlet 123b to the second water outlet 151, in conjunction with FIGS. 7 and 12. The design of this structure of the outlet pipe 150 may effectively solve the problem of pumping air at the outlet location caused by the pump during the pumping process, such that the water adequately fills the outlet region without mixing with air, ensuring the flow of water during the washing process.

In some embodiments, the ratio of the cross-sectional area of the outlet channel 150a at the first water outlet 123b to the cross-sectional area of the outlet channel 150a at the second water outlet 151 is about 1.63 to 1.99. The ratio setting may more effectively solve the problem of pumping air at the outlet location caused by the pump during the pumping process, thereby improving the flow rate during the washing process. Herein, the cross-sectional area is the area of the cross-section dissected parallel to the axial direction of the columnar filtering screen 330.

Figure 8:
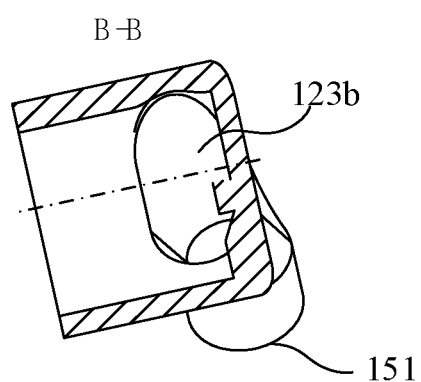
FIG. 8 is a cross-sectional schematic view of the filtering device along B-B in FIG. 6.

In some embodiments, referring to FIG. 8, the cross-section of the outlet channel 150a at the first water outlet 123b is substantially elliptical in shape and the ratio of the lengths of the long and short axes of the elliptical is substantially 5:3. The elliptical design allows more filtered water to enter the outlet tube 150 at the same time as the water is being discharged, ensuring that the water fills the outlet region sufficiently without air admixture.

In other embodiments, the cross-section of the outlet channel 150a at the first water outlet 123b may also be round, square, etc. In some embodiments, when a circular cross-section is adopted, the diameter of the circular cross-section is about 35 mm, i.e., the inner diameter of the outlet pipe 150 at that first water outlet 123b is about 35 mm.

In some embodiments, the outlet channel 150a has a substantially circular cross-section at the second water outlet 151. In some embodiments, the diameter of the circular cross-section of the outlet channel 150a at the second water outlet 151 is about 26 mm. The circular cross-section of the outlet channel 150a at the second water outlet 151 facilitates connection to external pipeline and thus to the pump.

Of course, in other embodiments, the shape of the cross-section of the outlet channel 150a at the first water outlet 123b and the second water outlet 151 and the size of the inner diameter of the outlet pipe 150 at the first water outlet 123b and the second water outlet 151 may be selected according to actual needs. The present disclosure is not limited herein specifically.

Referring to FIG. 7 and FIG. 13, the outlet pipe 150 includes a diameter-inconsistent portion 153 and a diameter-consistent portion 155 connected from the inside to the outside in the radial direction of the cup 120, and the diameter-inconsistent portion 153 and the diameter-consistent portion 155 are communicated with each other. By setting the diameter-inconsistent portion 153 and the diameter-consistent portion 155, it may be ensured that the water adequately fills the outlet region without mixing air, and the connection with the external pipeline may be facilitated. In some embodiments of the present disclosure, the length of the diameter-consistent portion 155 may be greater than or equal to 15 mm. In other embodiments, the length of the diameter-consistent portion 155 may be greater than or equal to 20 mm.

Figure 15:
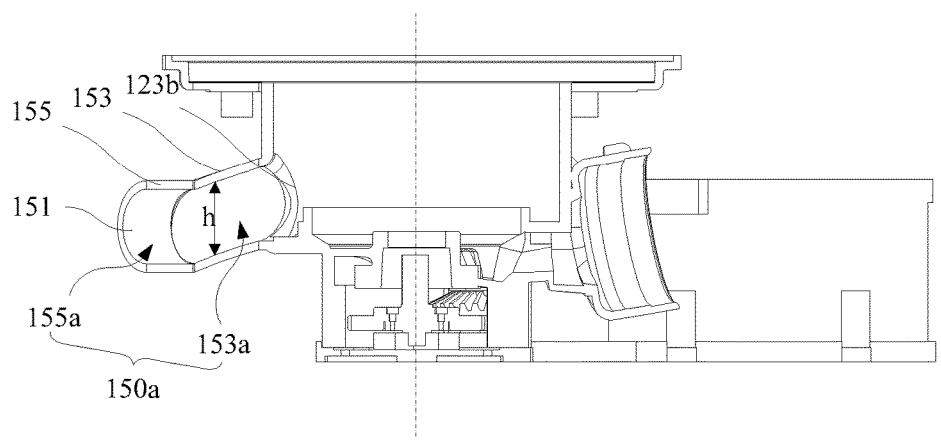
FIG. 15 is a cross-sectional structural schematic view of a filtering device according to an embodiment of the present disclosure.

In conjunction with FIG. 13 and FIG. 15, the diameter-inconsistent portion 153 is connected to the first peripheral wall 123 and defines a first sub outlet channel 153a connected to the return chamber 123a of the receiving cavity through the first water outlet 123b. The cross-sectional area of the first sub outlet channel 153a gradually decreases in the direction from the first water outlet 123b to the second water outlet 151.

The diameter-consistent portion 155 is arranged on a side of the outlet pipe 150 away from the return chamber 123a of the receiving cavity and defines a second sub outlet channel 155a communicated with the first sub outlet channel 153a, and the second water outlet 151 is arranged on the diameter-consistent portion 155. The first sub outlet channel 153a and the second sub outlet channel 155a form the aforementioned outlet channel 150a, and the cross-sectional area of the second sub outlet channel 155a remains constant along the direction from the first water outlet 123b toward the second water outlet 151.

In some embodiments, further referring to FIG. 13, the diameter-inconsistent portion 153 has a first side 153b and a second side 153c in a cross-section perpendicular to the axial direction of the cup 120 and over the geometric center of the first water outlet 123b. The first side 153b is near the water-extraction pump accommodating portion 170 and the second side 153c is away from the water-extraction pump accommodating portion 170. The diameter-inconsistent portion 153 has a cross-sectional area between the first side 153b and the first peripheral wall 123. The diameter-inconsistent portion 153 forms a first intersection 153d at the connection of the first side 153b with the first peripheral wall 123 and a second intersection 153e at the connection with the diameter-consistent portion 155, while the diameter-inconsistent portion 153 forms a third intersection 153f at the connection of the second side 153c with the first peripheral wall 123 and a fourth intersection 153g at the connection with the diameter-consistent portion 155. In some embodiments, the length of a line between the first intersection 153d and the second intersection 153e is less than the length of a line between the third intersection 153f and the fourth intersection 153g, and the angle between the line between the first intersection 153d and the second intersection 153e and a tangent line of the first peripheral wall 123 at the first intersection 153*d* is greater than the angle between the line between the third intersection 153*f* and the fourth intersection 153*g* and a tangent line of the first peripheral wall 123 at the third intersection 153*f*. In addition, the angle between the diameter-inconsistent portion 153 on the first side 153*b* and the diameter-consistent portion 155 may be less than the angle between the diameter-inconsistent portion 153 on the second side 153*c* and the diameter-consistent portion 155. With this structure, the connection between the outlet pipe 150 and the pump accommodated in the water-extraction pump accommodating portion 170 may be facilitated through the pipeline, and the stability and reliability of the connection or communication between the outlet pipe 150 and the pump may be ensured.

Of course, in other embodiments, the diameter-inconsistent portion section 153 may be arranged symmetrically about the centerline of the outlet pipe 150. That is, the length of the line between the first intersection 153*d* and the second intersection 153*e* is equal to the length of the line between the third intersection 153*f* and the fourth intersection 153*g*, and the angle between the line between the first intersection 153*d* and the second intersection 153*e* and the tangent line of the first peripheral wall 123 at the first intersection 153*d* is equal to the angle between the line between the third intersection 153*f* and the fourth intersection 153*g* and the tangent line of the first peripheral wall 123 at the third intersection 153*f*. The present disclosure is not specifically limited herein.

In some embodiments, a side of the outlet pipe 150 away from the water-extraction pump accommodating portion 170 (i.e., the second side 153*c* of the diameter-inconsistent portion 153) may be tangential to an outer peripheral wall of the cup 120 (specifically, the outer surface of the first peripheral wall 123), such that filtered water may enter the outlet pipe 150 more smoothly, thereby reducing the resistance to the water generated by the outlet pipe 150.

Referring to FIG. 15, in some embodiments of the present disclosure, the height of the outlet channel 150*a* along the axis of the columnar filtering screen 330 remains constant in the direction from the first water outlet 123*b* to the second water outlet 151, thereby reducing the installation height along the axis of the columnar filtering screen 330 and saving space in that direction, resulting in a lower installation height and more compact structure of the entire filtering device 10.

Further referring to FIGS. 1-2, in some embodiments, the filtering device 10 further includes a spray arm adapter 500 arranged on the plane filter 200, which is connected to and communicated with the spray arm adapter 130 on the tray 110, for spraying the filtered water of the filtering device 10 into the inner liner of the tableware washing apparatus through the spray arm adapter 500.

The plane filter 200 may include a face-shaped screen holder 250, and a first face-shaped screen 210 and a second face-shaped screen 230 arranged side by side in the first direction X. The first opening 250*a* is defined on the face-shaped screen holder 250. The columnar filtering screen 330 is disposed below the face-shaped screen holder 250 and facing the first opening 250*a*. Therefore, the water can fall from the first opening 250*a* into the columnar filtering screen 330 below the face-shaped screen holder 250. The spray arm adapter 500 is arranged on the face-shaped screen holder 250 and is spaced apart from the first opening 250*a* along the first direction X.

In some embodiments, the first face-shaped screen 210 and the second face-shaped screen 230 may both be plane screens. In other embodiments, the first face-shaped screen 210 and the second face-shaped screen 230 may be curved screens with curves, or one of the first face-shaped screen 210 and the second face-shaped screen 230 may be a plane screen and the other a curved screen. The present disclosure does not limit the shape of the first face-shaped screen 210 and the second face-shaped screen 230.

In some embodiments, referring to FIGS. 1-2 and 12, the second face-shaped screen 230 is away from the spray arm adapter 500 along the first direction X compared to the first face-shaped screen 210. The area of the first face-shaped screen 210 is greater than the area of the second face-shaped screen 230. In conjunction with FIG. 16, a first angle (β1 may be formed between the first face-shaped screen 210 and a reference plane perpendicular to the axial direction of the first opening 250*a*, and a second angle (β2 may be formed between the second face-shaped screen 230 and the reference plane, the first angle (β1 being less than the second angle (β2.

The above is embodiments in which the first face-shaped screen 210 and the second face-shaped screen 230 are separate structures, i.e., the first face-shaped screen 210 and the second face-shaped screen 230 are separately machined and stitched together. However, in other embodiments, the first face-shaped screen 210 and the second face-shaped screen 230 may each be of a one-piece structure; for example, the first face-shaped screen 210 and the second face-shaped screen 230 may be formed by bending the entire screen at a predetermined location. The present disclosure does not limit the way of forming and combining the first face-shaped screen 210 and the second face-shaped screen 230.

With the above structure design, the plane filter 200 is divided into a plurality of different face-shaped screens and spliced with each other through the face-shaped screen holder 250, which may increase the filtration area, improve the filtering speed, reduce the probability of empty pumping caused by untimely water return, and facilitate the manufacture of the plane filter 200. Moreover, because the inclination angles of the first face-shaped screen and the second face-shaped screen with different areas are not the same with respect to the reference plane, the distances between the first face-shaped screen and the second face-shaped screen at corresponding positions and the reference plane may be approximately equal, such that the water falls more smoothly into the tray 110 through the different positions of the plane filter 200 or into the columnar filtering screen 330 through the first opening 250*a*.

In some embodiments, the ratio of the first angle β1 to the second angle β2 may be 1:5 to 1:2. In some embodiments, the ratio of the first angle β1 to the second angle β2 is about 1:3.

Figure 16:
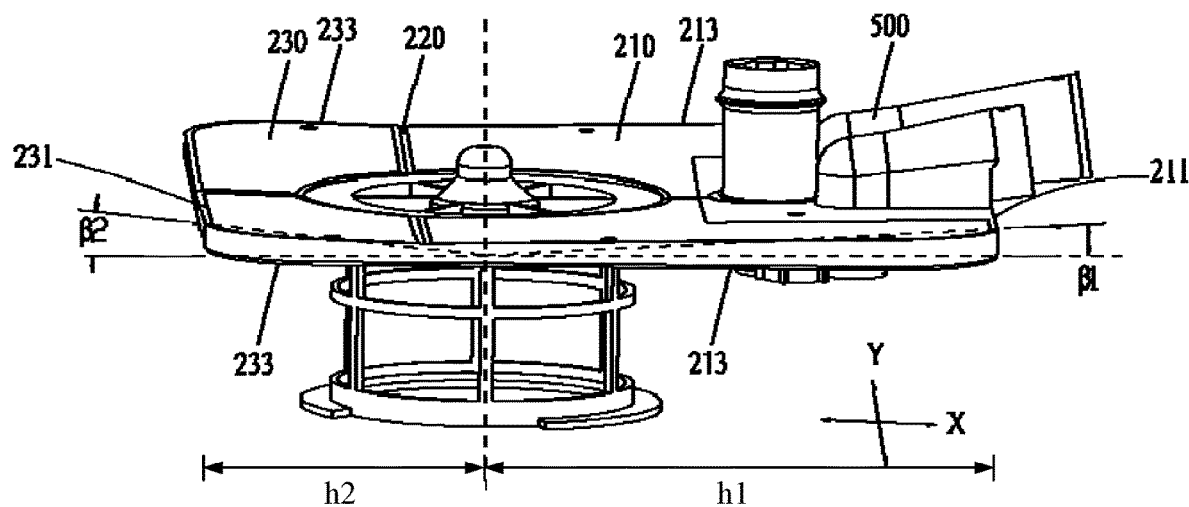
FIG. 16 is a perspective schematic view of a partial structure of a filtering device according to an embodiment of the present disclosure.

Referring further to FIG. 16, in some embodiments of the present disclosure, the first angle β1 and the second angle β2 are set such that a distance from an outer edge of the first face-shaped screen 210 away from the second face-shaped screen 230 along the first direction X and/or the second direction Y perpendicular to the first direction X to the reference plane along the axial direction of the first opening 250*a* is the same as a distance from an outer edge of the second face-shaped screen 230 away from the first face-shaped screen 210 along the first direction X and/or the second direction Y to the reference plane along the axial direction of the first opening 250*a*, thereby allowing the water to fall more smoothly into the tray 110 through the different positions of the plane filter 200 or into the columnar filtering screen 330 through the first opening 250*a*.

Specifically, in some embodiments, the opposing outer edges of the first face-shaped screen 210 and the second face-shaped screen 230 along the first direction X may be set at equal distances from the reference plane along the axial direction of the first opening 250a. For example, referring to FIG. 16, the first face-shaped screen 210 has a first outer edge 211 in the first direction, a projection of which in the reference plane is at a maximum distance h1 from the center of the first opening 250a, and a first angle β1 exists between the first face-shaped screen 210 and the reference plane. In a similar manner, the second face-shaped screen 230 has a second outer edge 231 in the first direction, and the second outer edge 231 and the first outer edge 211 are disposed on opposite sides of the first opening 250a, respectively. A projection of the second outer edge 231 in the reference plane is at a maximum distance h2 from the center of the first opening 250a, and a first angle β2 exists between the second face-shaped screen 230 and the reference plane. Therefore, the first face-shaped screen 210 and the second face-shaped screen 230 satisfy the following relationship: tan β1*h1=tan β2*h2.

Of course, in other embodiments, the opposing outer edges of the first face-shaped screen 210 and the second face-shaped screen 230 along the second direction Y may be set at equal distances from the reference plane along the axial direction of the first opening 250a. Specifically, in the embodiments shown in FIG. 16, the entire plane filter 200 is arranged symmetrically about the first direction X. The first face-shaped screen 210 has two opposing third outer edges 213 in the second direction Y, and the two third outer edges 213 are equidistant from the reference plane along the axial direction of the first opening 250a. Similarly, the second face-shaped screen 230 has two opposing fourth outer edges 233 in the second direction Y, and the two fourth outer edges 233 are equidistant from the reference plane along the axial direction of the first opening 250a.

In other embodiments, the first angle β1 and the second angle β2 are set such that the opposing outer edges of the first face-shaped screen 210 and the second face-shaped screen 230 along the first direction X are at equal distances from the reference plane along the axial direction of the first opening 250a, and the opposing outer edges of the first face-shaped screen 210 and the second face-shaped screen 230 along the second direction Y are at equal distances from the reference plane along the axial direction of the first opening 250a.

Referring further to FIG. 16, in some embodiments, a dividing line 220 of the first face-shaped screen 210 and the second face-shaped screen 230 is disposed on a side of the center of the first opening 250a away from the spray arm adapter 500 and intersecting with the first opening 250a. In other words, the dividing line 220 is off-center from the center of the first opening 250a. The eccentric arrangement of the dividing line 220 facilitates the arrangement of the spray arm adapter 500 while allowing the water to fall smoothly into the columnar filtering screen 330.

In some embodiments, the number of first face-shaped screens 210 and the number of second face-shaped screens 230 are each two. The two first face-shaped screens 210 are arranged side by side in the second direction perpendicular to the first direction X, and the two second face-shaped screens 230 are arranged side by side in the second direction perpendicular to the first direction X. Moreover, the dividing line between one first face-shaped screen 210 and one second face-shaped screen 230 and the dividing line between the other first face-shaped screen 210 and the other second face-shaped screen 230 are symmetrically arranged about a line connecting the center of the first opening 250a and the center of the spray arm adapter 500. That is, the two first plane screens 210 are arranged symmetrically about the line connecting the center of the first opening 250a and the center of the spray arm adaptor, and the two second plane screens 230 are arranged symmetrically about the line connecting the center of the first opening 250a and the center of the spray arm adaptor.

In some embodiments of the present disclosure, the mesh count of meshes of each of the first face-shaped screen 210 and the second face-shaped screen 230 is about 50 to 70 mesh. Specifically, in some embodiments, the diameter of an external circle defined by each mesh of each of the first face-shaped screen 210 and the second face-shaped screen 230 is about 0.2 to 0.5 mm, and the mesh spacing ranges from about 0.4 to 0.6 mm. In some embodiments, the diameter of the external circle defined by each mesh of each of the first face-shaped screen 210 and the second face-shaped screen 230 is about 0.2 to 0.4 mm. With this design, the residue in the water can be effectively filtered. In some embodiments, the diameter of the external circle defined by each mesh of each of the first face-shaped screen 210 and the second face-shaped screen 230 may be 0.3 to 0.4 mm, and the mesh spacing ranges from 0.6 to 1.0 mm.

Figure 17:
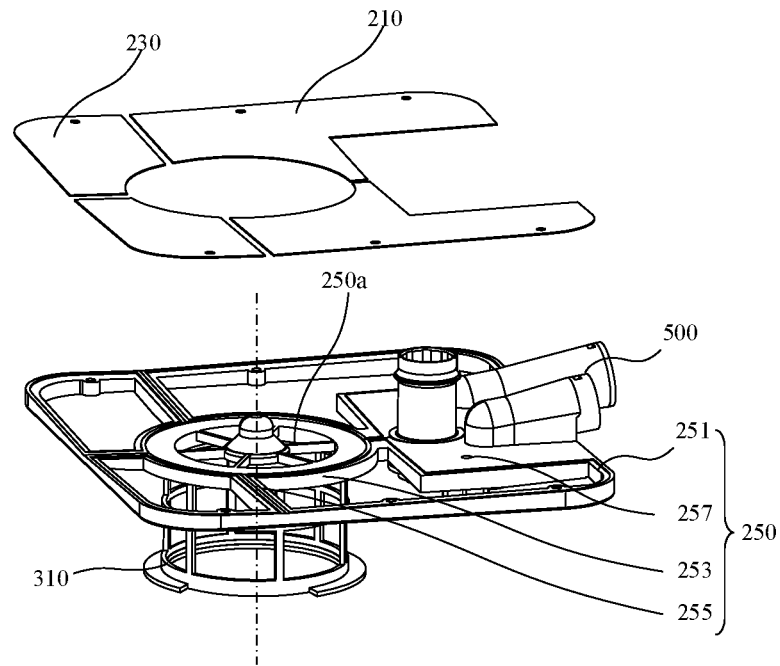
FIG. 17 is an exploded schematic view of the partial structure of the filtering device in FIG. 16.

Referring to FIG. 17, in some embodiments, the face-shaped screen holder 250 may include an outer frame 251, an inner frame 253 embedded within the outer frame 251 and facing the first opening 250a, and at least one support rib 255 connected between the outer frame 251 and the inner frame 253. The outer frame 251 and the inner frame 253 enclose a receiving region for the first face-shaped screen 210 and the second face-shaped screen 230, and the at least one support rib 255 divides the receiving region into regions for receiving the first face-shaped screen 210 and the second face-shaped screen 230. Edges of the first face-shaped screen 210 and the second face-shaped screen 230 abut against the outer frame 251, the inner frame 253, and the at least one support rib 255, respectively, such that the first face-shaped screen 210 and the second face-shaped screen 230 are supported on the face-shaped screen holder 250.

In the embodiments shown in FIG. 17, the number of first face-shaped screens 210 and the number of second face-shaped screens 230 are each two, and the number of support ribs 255 is four. The inner frame 253 is generally circular in shape and the four support ribs 255 are arranged around a circumference of the inner frame 253, thereby dividing the receiving region into four regions (corresponding to the two first face-shaped screens 210 and two second face-shaped screens 230), such that the first face-shaped screens 210 and the second face-shaped screens 230 are firmly supported on the face-shaped screen holder 250. Moreover, the support ribs 255 are adopted to divide the receiving region to facilitate the processing and shaping of the filtering screens.

As further shown in FIG. 17, in some embodiments, the face-shaped screen holder 250 may further include a support platform 257 connected between the outer frame 251 and the inner frame 253 and arranged adjacent to the first face-shaped screen 210. The spray arm adapter 500 is arranged on the support platform 257.

Figure 18:
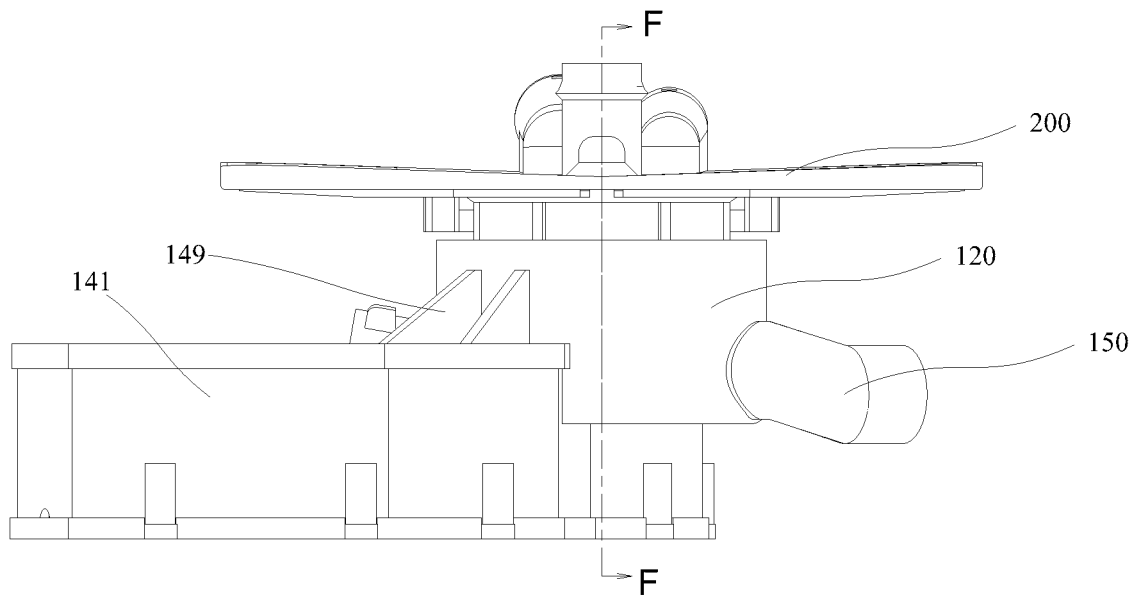
FIG. 18 is a plan schematic view of a filtering device according to an embodiment of the present disclosure.
Figure 19:
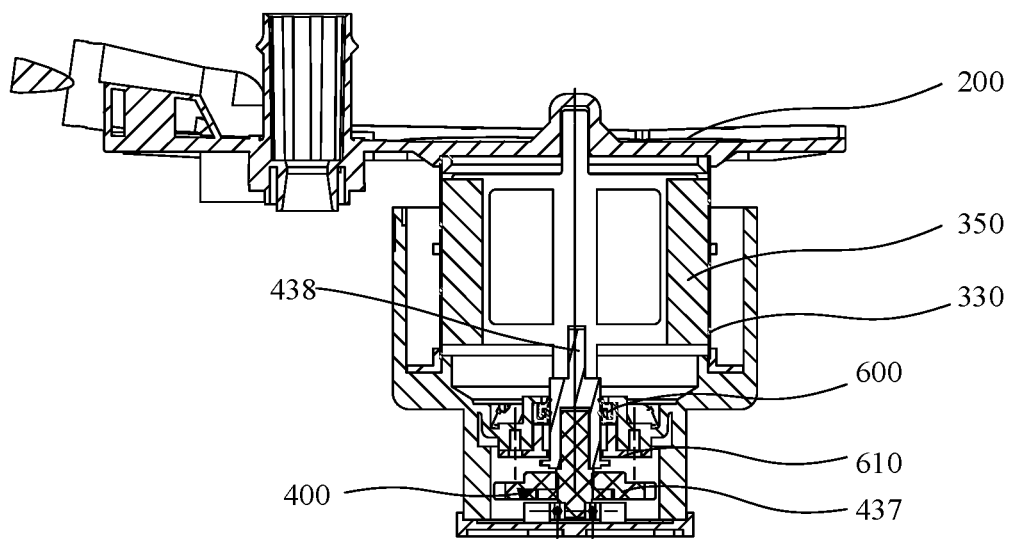
FIG. 19 is a cross-sectional schematic view of the filtering device along F-F in FIG. 18 according to an embodiment of the present disclosure.

Continuing with FIG. 2 and FIGS. 18-19, in some embodiments, the rotary filter 300 may include a columnar screen holder 310 and the columnar filtering screen 330. The columnar screen holder 310 is inserted within the cup 120. The columnar filtering screen 330 is supported on the columnar screen holder 310 and is arranged facing the first opening 250a for filtering the water. The columnar filtering screen 330 is rotatable relative to the contents of the columnar filtering screen 330.

In some embodiments, the columnar screen holder 310 may be integrally molded with the inner frame 253, which may make the whole filtering device better integrated and sealed, and may reduce the possibility of residue leaking out to the return chamber 123a through the seams or fits of the inner frame 253 and the columnar screen holder 310. Of course, in other embodiments, the columnar screen holder 310 may be separated from the inner frame 253 and may be rotatably connected to the inner frame 253, thereby facilitating the rotation of the columnar screen holder 310 and the columnar filtering screen 330 supported thereon relative to the plane filter 200.

In some embodiments, the contents of the columnar filtering screen 330 are rotatable by the drive assembly 400, thereby allowing the columnar filtering screen 330 to rotate relative to the contents. For example, in the embodiments shown in FIG. 2, the rotary filter 300 includes the columnar filtering screen 330, the columnar screen holder 310, and a cleaning element 350, where the specific design of the columnar screen holder 310 and the columnar filtering screen 330 is as previously described and will not be repeated herein. In the embodiments, the columnar screen holder 310 may be integrally formed with the inner frame 253. The cleaning element 350 is accommodated within the columnar filtering screen 330 and is in contact with, or abutting against, an inner wall (or inner surface) of the columnar filtering screen 330. In some embodiments, a bottom of the cleaning element 350 may further be in contact with and supported on the support tab 127. Of course, in other embodiments, the cleaning element 350 may not be in contact with the support tab 127.

Figure 20:
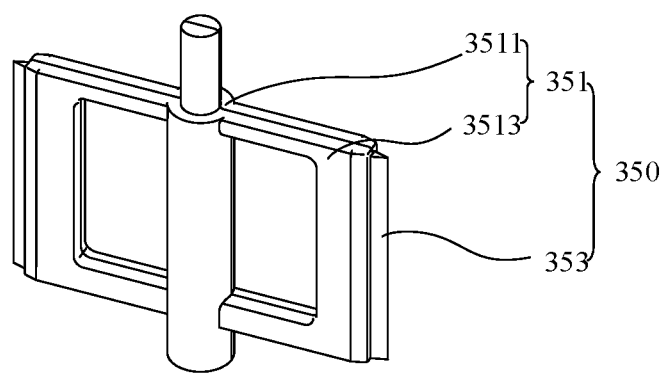
FIG. 20 is a perspective structural schematic view of a cleaning element according to an embodiment of the present disclosure.

Referring further to FIGS. 18-19, the drive assembly 400 may be connected to the cleaning element 350 to drive the cleaning element 350 to rotate for separating at least a portion of the residue from the columnar filtering screen 330 by the cleaning element 350. In some embodiments, the drive assembly 400 may drive the cleaning element 350 to rotate relative to the columnar filtering screen 330 at a speed of about 150 to 400 r/min. Using the cleaning element 350 to rotate at this speed reduces the probability of failure to form a residue collection caused by residue being thrown out of the columnar filtering screen 330 due to excessive rotation speed, and also reduces the probability that resistance to the flow of water will be formed due to too little rotation speed. Referring to FIG. 20, in some embodiments, the cleaning element 350 may include a mounting bracket 351 and a contact portion 353 arranged on the mounting bracket 351. The mounting bracket 351 may be connected to the drive assembly 400 and rotatable under the drive of the drive assembly 400, thereby driving the entire cleaning element 350 to rotate. The contact portion 353, in turn, contacts the inner wall of the columnar filtering screen 330 such that at least a portion of the residue on the columnar filtering screen 330 can be scraped off to separate at least a portion of the residue from the columnar filtering screen 330.

In some embodiments, referring to FIG. 20, the mounting bracket 351 may include a connection portion 3511 and a shelf portion 3513. The connection portion 3511 is coaxially disposed with a motor of the drive assembly 400 and is rotatable under the drive of the motor. A side of the shelf portion 3513 is connected to the connection portion 3511, and the contact portion 353 may be arranged on another side of the shelf portion 3513 away from the connection portion 3511. The number of contact portions 353 is the same as the number of shelf portions 3513, or to say, the contact portions 353 are in one-to-one correspondence with the shelf portions 3513.

In some embodiments, the shelf portion 3513 may be integrally formed with the connection portion 3511. Of course, in other embodiments, the shelf portion 3513 may be molded separately from the connection portion 3511. Moreover, the shape of the shelf portion 3513 is not limited to the frame structure with a hollow portion shown in the drawings, and in some embodiments, the shelf portion 3513 may be a solid (not hollow) structure.

Figure 21:
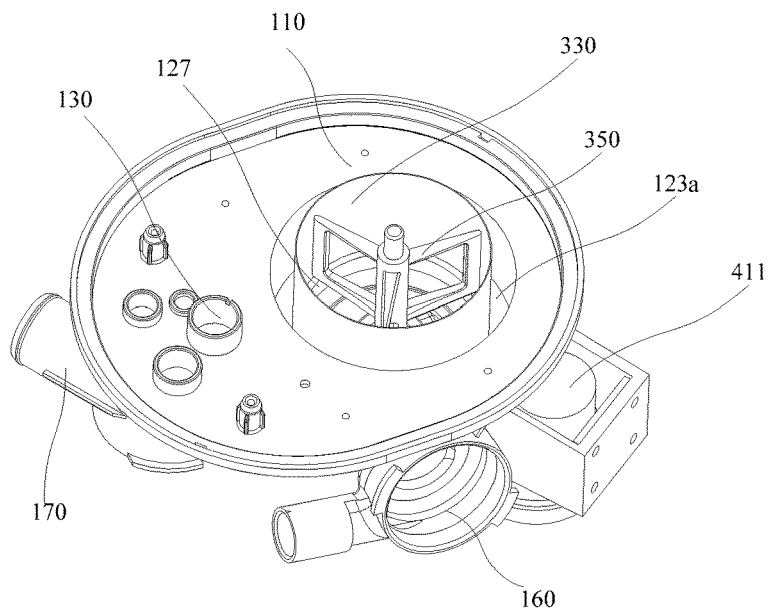
FIG. 21 is a perspective schematic view of a partial structure of a filtering device according to another embodiment of the present disclosure.

In some embodiments, the cleaning element 350 may include at least two shelf portions 3513, and each shelf portion 3513 is arranged with a contact portion 353. When the cleaning element 350 includes two shelf portions 3513, the number of contact portions 353 is also two, and the two shelf portions 3513 may be arranged symmetrically about an axial direction of the connection portion 3511, as shown in FIGS. 19-20. Of course, in other embodiments, three or more shelf portions 3513 and three or more contact portions 353 may be arranged. For example, in the embodiments shown in FIG. 21, the number of the shelf portions 3513 and the number of the contact portions 353 are each three, and the three shelf portions 3513 are evenly distributed at equal distances along the circumference of the connection portion 3511. In some embodiments, the number of the shelf portion 3513 and the number of the contact portion 353 are each one. The present disclosure does not limit the number, material, and size of such shelf portion 3513 and contact portion 353.

In some embodiments, the contact portion 353 may be a scraper, and the contact portion 353 may be made of, for example, silicone, rubber, and other materials. In addition, the contact portion 353 has a height of about 40 to 60 mm and a width of about 0.9 to 1.1 mm. During rotation of the cleaning element 350, the contact portion 353 may generate a torque of about 0.4 to 0.6 N*m to cause as much residue as possible to fall off or be separated from the columnar filtering screen 330.

Figure 22:
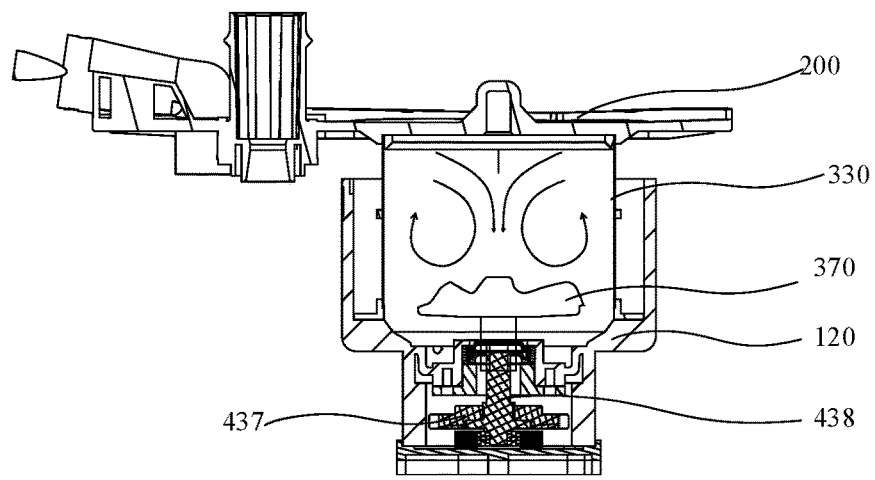
FIG. 22 is a cross-sectional schematic view of a filtering device according to another embodiment of the present disclosure.

In some embodiments, a wave wheel may be applied in place of the above cleaning element 350. Referring to specifically FIGS. 22-23, in the embodiments, the rotary filter 300 may include the columnar screen holder 310, the columnar filtering screen 330, and a wave wheel 370. The specific design of the columnar screen holder 310 and the columnar filtering screen 330 is as previously described and will not be repeated herein. In the embodiments, the columnar screen holder 310 may be integrally formed with the inner frame 253. The wave wheel 370 is rotatably accommodated in the columnar filtering screen 330 and is disposed at a bottom of the columnar filtering screen 330, i.e., on a side away from the plane filter 200. The drive assembly 400 is connected to the wave wheel 370 to drive the wave wheel 370 to rotate relative to the columnar filtering screen 330 at a speed of about 500 to 700 r/min for stirring the water within the columnar filtering screen 330, such that at least a portion of the residue cannot adhere to the columnar filtering screen 330, thereby allowing at least a portion of the residue to be separated from the columnar filtering screen 330 and facilitating water penetration through the mesh of the columnar filtering screen 330 to the return chamber 123a to achieve effective filtration. The use of the wave wheel 370 rotating at this speed reduces probability of failure to form a residue collection caused by residue being thrown out of the columnar filtering screen 330 due to excessive rotation speed, and also reduces the probability that resistance to the flow of water will be formed due to too little rotation speed.

Figure 23:
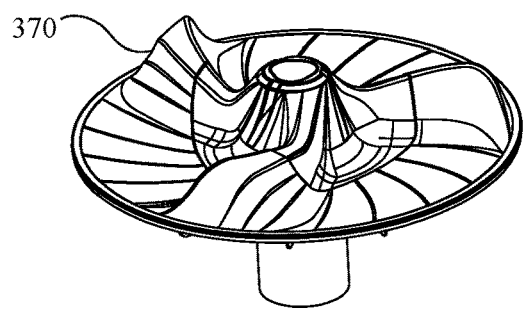
FIG. 23 is a perspective structural schematic view of a pulsator in FIG. 22.

In some embodiments, the wave wheel 370 may have three blades, as shown in FIG. 23. Of course, in other embodiments, the wave wheel 370 may include five or more blades. The present disclosure does not limit the number of blades of the wave wheel 370 herein. Moreover, the shape of the wave wheel 370 is not limited to the shape shown in FIG. 23, and may take any suitable shape, as long as the wave wheel can stir the water in the columnar filtering screen 330.

The above is embodiments in which the contents of the columnar filtering screen 330 (e.g., the cleaning element 350 and the wave wheel 370) can be rotated relative to the columnar filtering screen 330 such that at least a portion of the residue can be separated from the columnar filtering screen 330. However, in other embodiments, it is also possible to separate at least a portion of the residue from the columnar filtering screen 330 by rotating the columnar filtering screen 330. By rotating the columnar filtering screen 330, a portion of the columnar filtering screen 330 adjacent to the first water outlet 123b can be changed such that the residue can be dispersed to different positions of the columnar filtering screen 330, thereby effectively reducing the possibility of local blockage caused by the residue collecting at a certain position of the columnar filtering screen 330, facilitating the stripping and cleaning of at least a portion of the residue from the columnar filtering screen 330, and improving the filtration performance of the filtering device 10 and improving the overall tableware washing apparatus.

Figure 24:
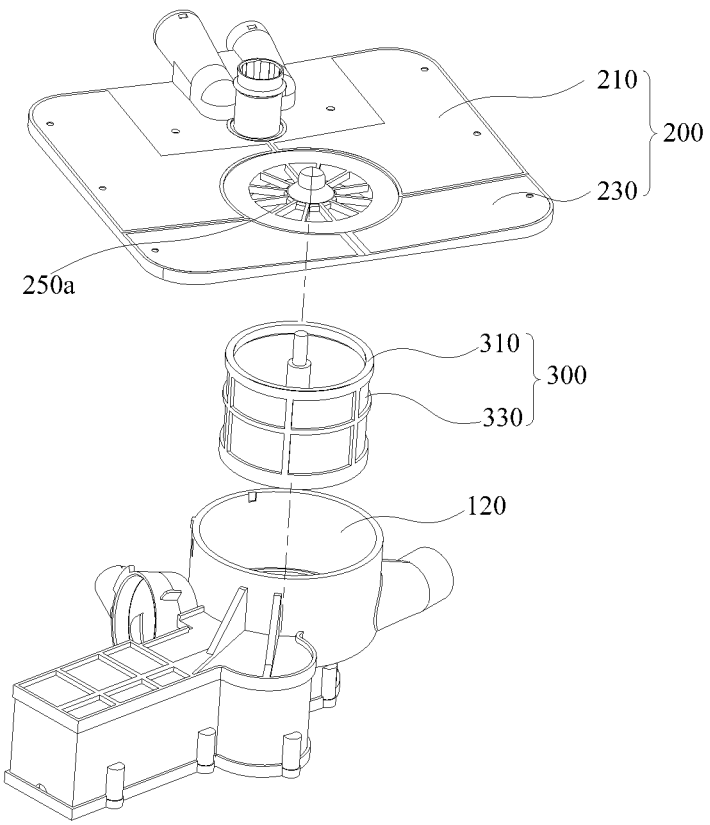
FIG. 24 is an exploded schematic view of a filtering device according to another embodiment of the present disclosure.
Figure 25:
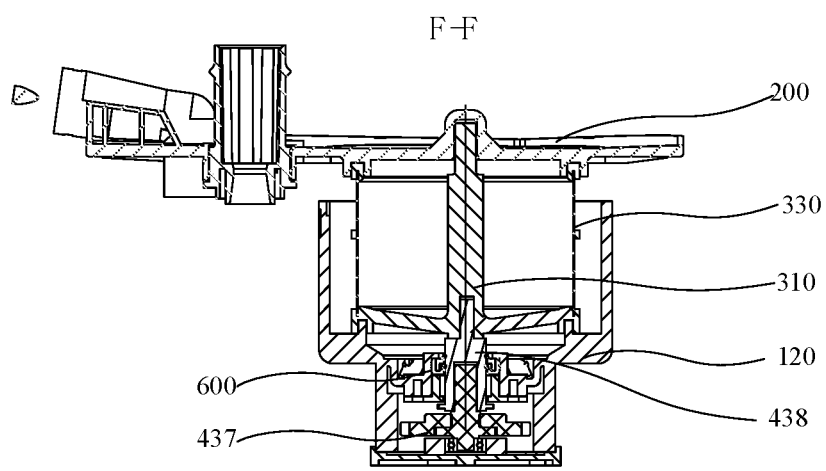
FIG. 25 is a cross-sectional schematic view of the filtering device along F-F in FIG. 18 according to another embodiment of the present disclosure.

For example, referring to FIGS. 24-25, in some embodiments of the present disclosure, the rotary filter 300 may include a columnar screen holder 310 and a columnar filtering screen 330, and the columnar filtering screen 330 is supported on the columnar screen holder 310. The drive assembly 400 is connected to the columnar screen holder 310 and drives the columnar screen holder 310 to rotate, and the columnar screen holder 310 drives the columnar filtering screen 330 to rotate relative to the water in the columnar filtering screen 330, such that at least a portion of the residue can be separated from the columnar filtering screen 330 by the rotation of the columnar filtering screen 330. The rotation speed of the columnar filtering screen 330 is about 500 to 700 r/min. In addition, the height of the cup 120 is about 90 to 110 mm, the inner diameter of the cup 120 is about 80 to 100 mm, and the inner diameter of the columnar filtering screen 330 is about 60 to 80 mm. Driving the columnar filtering screen 330 to rotate at this speed, while matching the inner diameter of the cup 120 and the inner diameter of the columnar filtering screen 330, may reduce the probability of failure to form a residue collection caused by residue being thrown out of the columnar filtering screen 330 due to excessive rotation speed, and also reduces the probability that resistance to the flow of water will be formed due to too little rotation speed, thereby effectively reducing the problem of pumping air in the water return process, ensuring smooth water flow and filling the return chamber, reducing the possibility of the air being mixed in the return chamber 123a, thus ensuring the washing process flow, improving the filtration performance, and achieving better filtering effect. In the embodiments, the outlet channel 150a may be of the cross-section-inconsistent design shown in FIG. 13.

Figure 26:
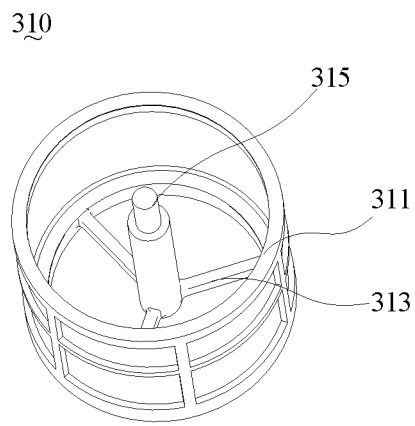
FIG. 26 is a perspective structural schematic view of a rotary filter in FIG. 24 along a viewing angle direction.
Figure 27:
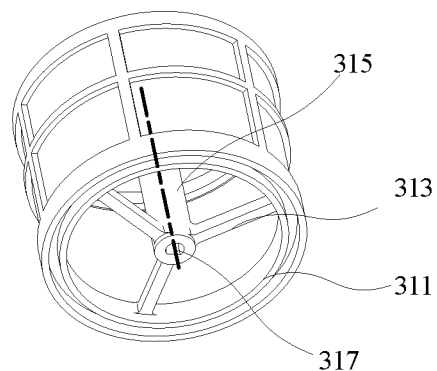
FIG. 27 is a perspective structural schematic view of a rotary filter in FIG. 24 along another viewing angle direction.

In the embodiments, further referring to FIGS. 26-27, the columnar screen holder 310 includes a main part 311, a positioning post 315, and at least one connecting rib 313 connecting the main part 311 and the positioning post 315. The main part 311 has a columnar frame structure and the columnar filtering screen 330 may be hung or supported on the main part 311. The positioning post 315 is disposed at a position substantially at a central axis of the main part 311 to be connected to an output shaft of the drive assembly 400 (e.g., the output shaft 438 of the second spur gear 437 shown in FIG. 25) and the inner frame 253 of the plane filter 200. The positioning post 315 may define an assembly hole 317 at an end connected to the drive assembly 400, and the output shaft of the drive assembly 400 may be inserted in the assembly hole 317, thereby driving the positioning post 315 to rotate the columnar screen holder 310, which in turn rotates the columnar filtering screen 330 arranged on the columnar screen holder 310.

In some embodiments, the number of the connecting ribs 313 is two or more. In the embodiments shown in FIGS. 26-27, the columnar screen holder 310 includes three connecting ribs 313, and the three connecting ribs 313 may be evenly distributed around a circumference of the positioning post 315.

Figure 28:
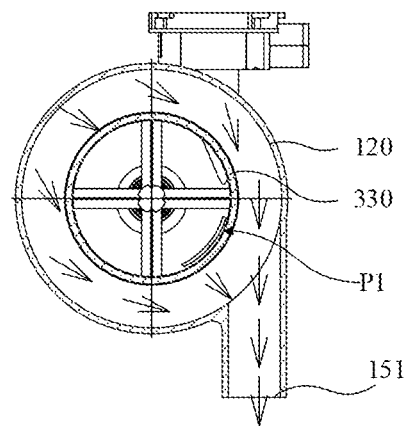
FIG. 28 is a schematic view of a relationship between residue and water flow direction at a first moment using the filtering device in FIG. 24.
Figure 29:
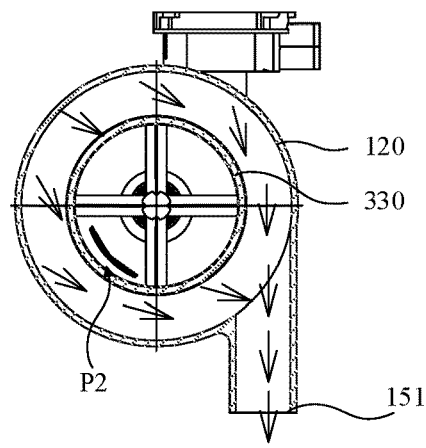
FIG. 29 is a schematic view of a relationship between residue and water flow direction at a second moment using the filtering device in FIG. 24.
Figure 30:
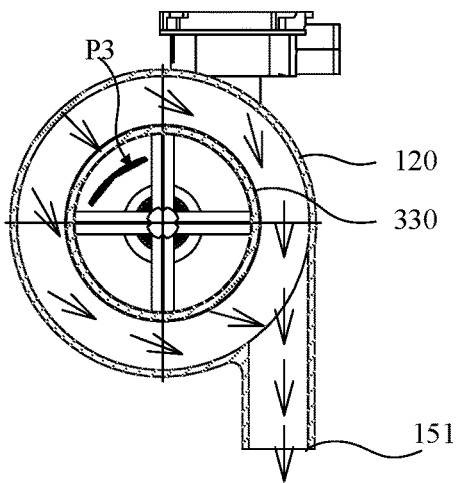
FIG. 30 is a schematic view of a relationship between residue and water flow direction at a third moment using the filtering device in FIG. 24.
Figure 31:
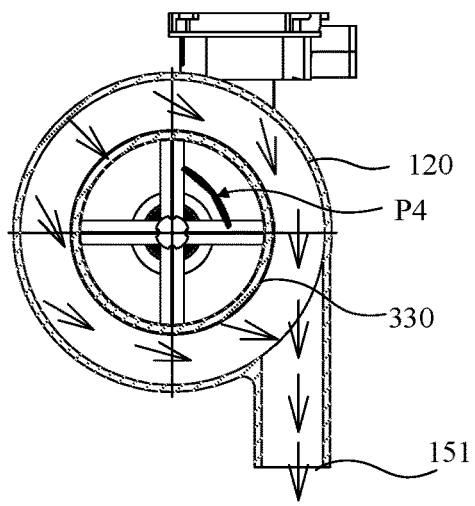
FIG. 31 is a schematic view of a relationship between residue and water flow direction at a fourth moment using the filtering device in FIG. 24.

FIGS. 28-31 illustrate a relative position of the residue in relation to the direction of water flow in the return chamber 123a at different moments when filtering with the rotatable columnar filtering screen 330. In this case, the filtered water flows out of the return chamber through the first outlet. As shown in FIG. 28, at a first moment, after the filtration of the columnar filtering screen 330, the residue is disposed at a first position P1. At this time, the residue adheres to the inner surface of the columnar filtering screen 330 due to the suction force near the first water outlet 123b (suction force is generated by the pump). As shown in FIG. 29, at a second moment, the columnar filtering screen 330 is rotated at an angle driven by the drive assembly 400 such that the residue is disposed at a second position P2. At this time, the water disposed in the return chamber reacts to the residue on the columnar filtering screen 330 due to the suction force of the pump, such that the residue begins to separate from the columnar filtering screen 330. Subsequently, as shown in FIG. 30, the columnar filtering screen 330 continues to rotate and at a third moment the residue reaches a third position P3 and is completely separated from the columnar filtering screen 330. And at a fourth moment, as shown in FIG. 31, the columnar filtering screen 330 is rotated to a predetermined position such that the residue is disposed in a fourth position P4, at which time the residue has been completely separated from the columnar filtering screen 330 without adhering to the inner surface of the columnar filtering screen 330, and the residue further approaches the axial direction of the columnar filtering screen 330 and can fall into the discharge cavity 125a. Therefore, by rotating the columnar filtering screen 330, the portion of the columnar filtering screen 330 adjacent to the first water outlet 123b can be changed such that the residue can be dispersed to different positions of the columnar filtering screen 330, thereby effectively reducing the possibility of local blockage caused by the residue collecting at a certain position of the columnar filtering screen 330, facilitating the stripping and cleaning of at least a portion of the residue from the columnar filtering screen 330, thus allowing the water to smoothly penetrate into the return chamber 123a and flow into the outlet pipe 150. In this way, the filtration performance of the filtering device 10 and the overall stability of the tableware washing apparatus can be improved.

In the embodiments, the rotation of the columnar filtering screen 330 is driven by an external drive assembly 400. Of course, in other embodiments, it is possible to drive the rotation of the columnar filtering screen 330 without an external drive, for example by the force of the water flow itself. The present disclosure does not limit the driving force of the columnar filtering screen 330 herein.

Figure 33:
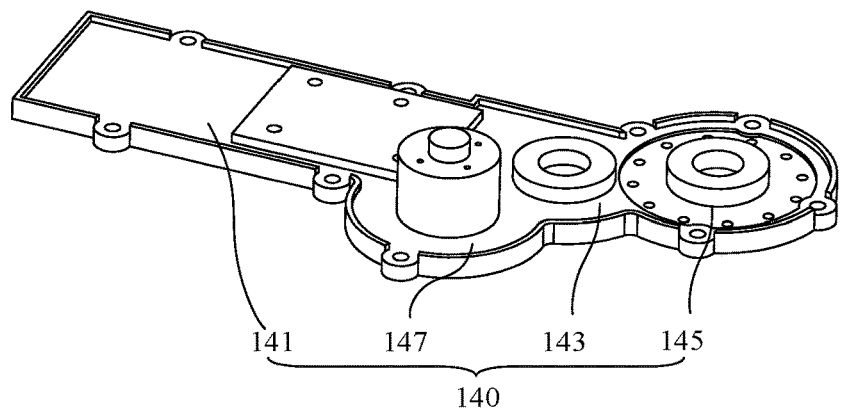
FIG. 33 is a perspective structural schematic view of a drive accommodating portion according to an embodiment of the present disclosure.
Figure 34:
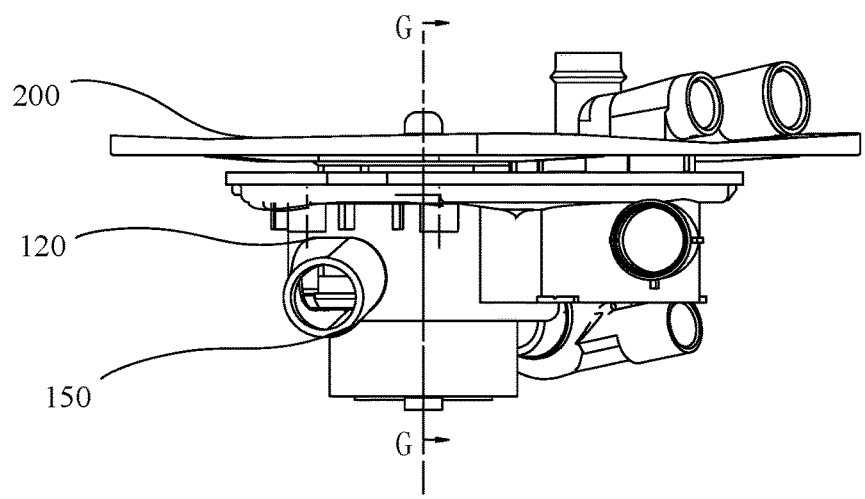
FIG. 34 is a plan schematic view of a filtering device according to another embodiment of the present disclosure.

Referring further to FIGS. 32 and 33, in some embodiments, the drive assembly 400 may include a motor 410 and a reduction mechanism 430. The motor 410 is arranged horizontally, i.e., an output shaft 411 of the motor 410 is perpendicular to the axial direction of the cup 120, thereby saving space in the height direction and making the entire filtering device 10 more compact.

In some embodiments, the reduction mechanism 430 may be a reduction gear mechanism, which may include a first bevel gear 431, a second bevel gear 433, a first straight gear 435, and a second spur gear 437. The first bevel gear 431 and the first straight gear 435 are arranged coaxially. The second bevel gear 433 is connected to the output shaft 411 of the motor 410 and engages with the first bevel gear 431. The second spur gear 437 engages the first spur gear 435, and an output shaft 438 of the second spur gear 437 is inserted into the cup 120 from an outer surface (bottom surface) of the bottom of the cup 120 and is connected to a portion of the rotary filter 300 (e.g., the aforementioned columnar screen holder 310, cleaning element 350, or wave wheel 370), thereby driving the columnar filtering screen 330 to rotate relative to the contents. In some embodiments of the present disclosure, the reduction mechanism 430 may further include a cantilever assembly 439, and the cantilever assembly 439 is configured to hold down the first bevel gear 431 and the first spur gear 435.

In some embodiments, the motor 410 has a mounting height along the axial direction of the cup 120 of substantially about 80 to 100 mm, and the motor 410 may be accommodated within the drive accommodating portion 140. In some embodiments, the top of the motor 410 does not protrude from the top surface of the cup 120, and the bottom of the motor 410 does not protrude from the bottom surface of the cup 120.

Therefore, when this type of reduction mechanism is applied, the rotational motion can be converted into a right angle change of direction by means of multiple stages of gears (two bevel gears and two spur gears), and together with the motor being set horizontally, it is thus possible to incorporate the drive assembly 400 without changing the original height of the filtering device 10, thereby saving space along the height direction of the filtering device 10 and making the entire filtering device 10 more compact.

Of course, in other embodiments, as described above, the bottom of the motor 410 may partially protrude from the bottom surface of the cup 120, as long as the ratio of the protruding height of the bottom surface of the drive accommodating portion 140 to the height of the motor is less than 1:1, thereby saving space along the height of the filtering device 10 and making the entire filtering device 10 more compact.

Referring further to FIGS. 32 and 33, the drive accommodating section 140 is arranged facing the reduction mechanism 430. Specifically, in some embodiments, the drive accommodating portion 140 may include a motor mounting part 141, a first fixing part 143, a second fixing part 145, and a third fixing part 147. The motor 410 may be arranged on the motor mounting part 141. The first fixing part 143 has a generally circular outer profile and is intersected with the motor mounting portion 141, for arranging the coaxially fixed first bevel gear 431 and the first spur gear 435. The second fixing part 145 has a generally circular outer profile and is intersected with the first fixing part 143. The second fixing part 145 is disposed below the cup 120 and is configured to arrange the second spur gear 437. The third fixing part 147 has a generally circular outer contour and is intersected with both the motor mounting portion 141 and the first fixing part 143, for arranging the cantilever assembly 439. In the embodiments, the cantilever assembly 439 may extend from the third fixing part 147 to the first fixing part 143.

Of course, in some embodiments, the third fixing portion 147 and the cantilever assembly 439 may be omitted or arranged in another manner, as long as the proper operation of the drive assembly is ensured. In some embodiments, referring to FIG. 19, an oil seal 600 may be arranged between the output shaft 438 of the second spur gear 437 and the cup 120. The oil seal 600 may ensure the rotation of the output shaft 438 and reduce the possibility of failure of the reduction mechanism 430 caused by water in the cup 120 seeping into the reduction mechanism 430.

In the above embodiments, the reduction mechanism is implemented by a reduction gear mechanism. However, in other embodiments, the reduction mechanism may be implemented using other reduction mechanisms, such as a belt drive mechanism.

For example, referring to FIGS. 34-37, in some embodiments of the present disclosure, the drive assembly 400 may include a motor 410a, an active wheel 431a, a driven wheel 433a, and a belt 435a connecting the active wheel 431a and the driven wheel 433a. In the embodiments, the motor 410a is accommodated in the drive accommodating portion 140, and an output shaft 411a of the motor 410a is arranged along the axial direction of the cup 120 and extends to the outside of the drive accommodating portion 140. The active wheel 431a is arranged on the outside of the drive accommodating portion 140 and is connected to the output shaft 411a of the motor 410a. The driven wheel 433a is arranged on the outside of the drive accommodating portion 140 and is in transmission connection with the main wheel 431a through the belt 435a. In addition, an output shaft 438a of the driven wheel 433a is inserted inside the cup 120 from the outer surface of the bottom of the cup 120 and is connected to a portion of the rotary filter 300 (e.g., the aforementioned columnar screen holder 310, the cleaning element 350, or the wave wheel 370), thereby driving the columnar filtering screen 330 to rotate relative to the contents. This type of reduction mechanism 430a has a relatively simple structure and is easy to machine and manufacture.

In the embodiments shown in FIGS. 34-37, the drive accommodating portion 140 accommodates only the motor 410a, and the active wheel 431a, driven wheel 433a, and belt 435a are arranged on the outside of the drive accommodating portion 140. Of course, in other embodiments, the motor 410a, the active wheel 431a, the driven wheel 433a, and the belt 435a may all be accommodated inside the drive accommodating portion 140. The present disclosure is not specifically limited in this regard.

Figure 35:
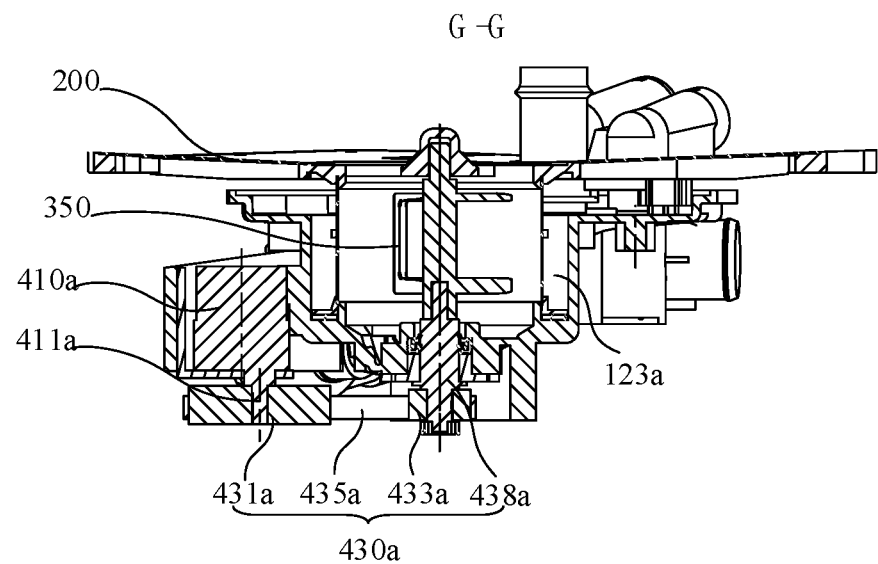
FIG. 35 is a cross-sectional schematic view of the filtering device along G-G in FIG. 34 according to an embodiment of the present disclosure.
Figure 36:
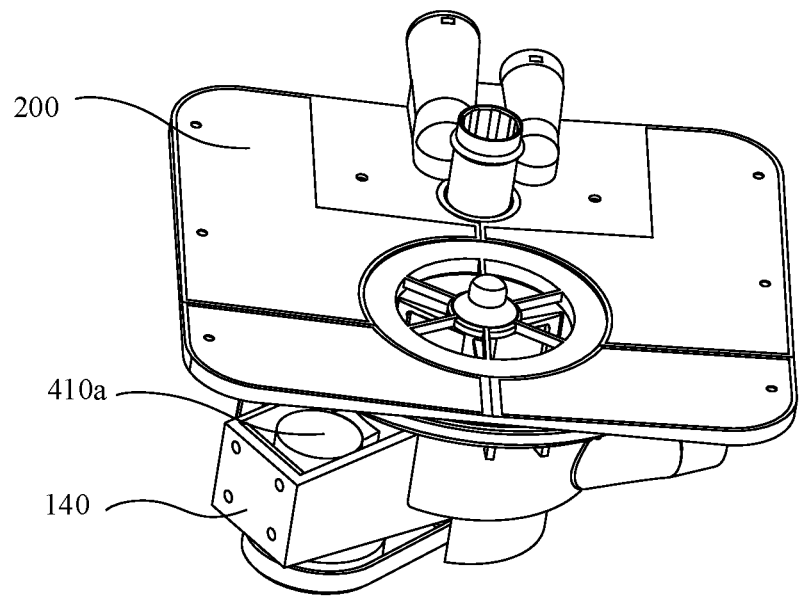
FIG. 36 is a perspective structural schematic view of a filtering device according to further another embodiment of the present disclosure along a viewing angle direction.
Figure 37:
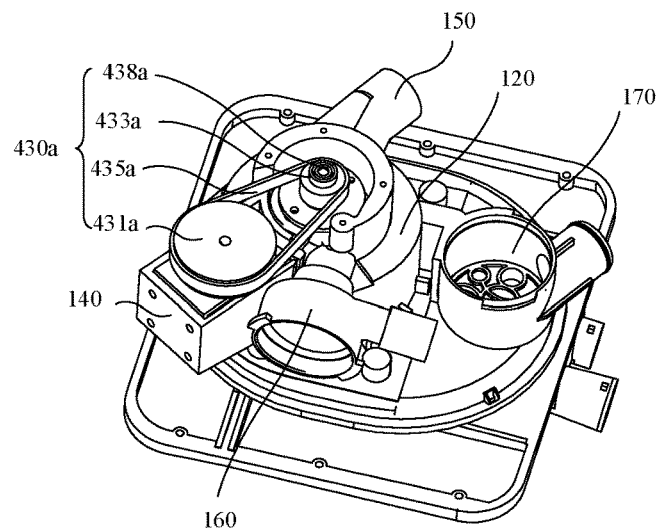
FIG. 37 is a perspective structural schematic view of the filtering device in FIG. 36 along another viewing angle direction.

In some embodiments, referring to FIG. 35, an oil seal 600 may be arranged between the output shaft 438a of the driven wheel 433a and the cup 120. The oil seal 600 may ensure the rotation of the output shaft 438a and reduce the possibility of failure of the reduction mechanism 430a caused by water in the cup 120 seeping into the reduction mechanism 430a.

Both of the above embodiments employ a motor to drive the rotation. However, in other embodiments, other drive methods may be used, such as pneumatic drive, liquid drive, etc.

Figure 38:
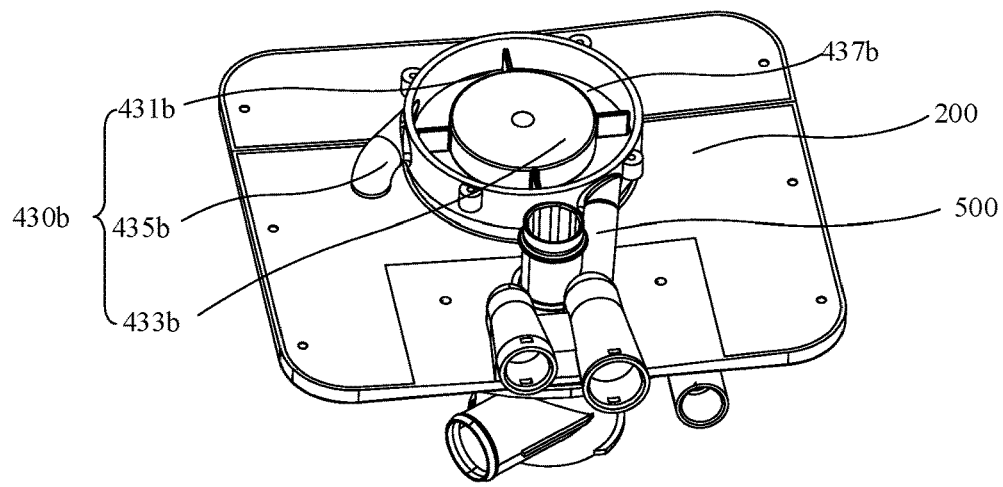
FIG. 38 is a perspective structural schematic view of a filtering device according to further another embodiment of the present disclosure.
Figure 39:
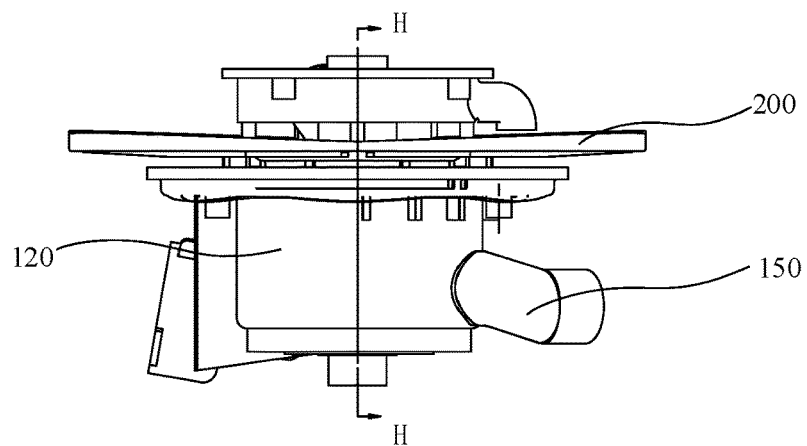
FIG. 39 is a plan schematic view of a filtering device according to further another embodiment of the present disclosure.
Figure 40:
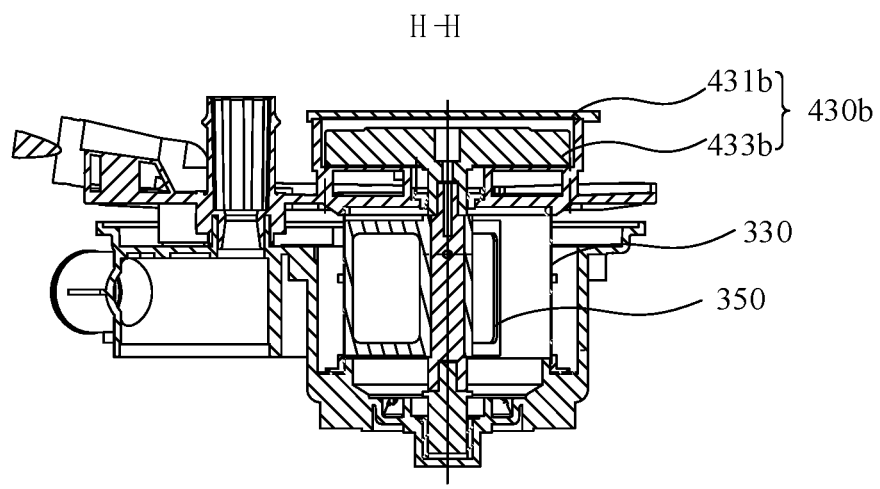
FIG. 40 is a cross-sectional schematic view of the filtering device along H-H in FIG. 39.

For example, in the embodiments shown in FIGS. 38-40, a liquid drive may be applied. Referring specifically to FIGS. 38-40, the drive assembly 400 may be implemented by a water wheel housing mechanism 430b. The water wheel housing mechanism 430b may include a water wheel housing 431b, a water wheel 433b, and a drain pipe 435b. The water wheel housing 431b is arranged on the tray 110. The water wheel housing 431b is substantially annular in structure, and the water wheel housing 431b may enclose a drive fluid cavity 437b. The number of the spray arm adapters 500 is at least two, and the drive fluid cavity 437b is communicated with one of the at least two spray arm adapters 500 such that water delivered to one of the at least two spray arm adapters 500 (i.e., the spray arm adapter 500 connected to the drive fluid cavity 437b) may further enter the drive fluid cavity 437b.

Figure 41:
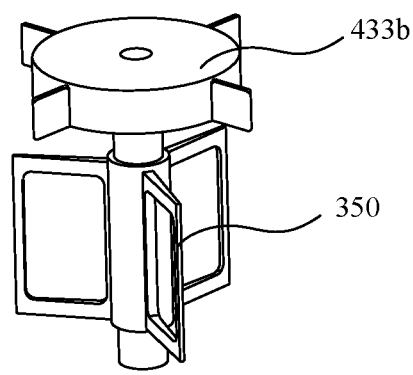
FIG. 41 is a cooperation relationship schematic view between a water wheel and a cleaning element according to an embodiment of the present disclosure.

The water wheel 433b may be accommodated in the drive fluid cavity 437b, and the water wheel 433b may be driven to rotate by the force exerted on the water wheel 433b by the water entering the drive fluid cavity 437b. In conjunction with FIG. 41, the water wheel 433b is also connected to at least a portion of the rotary filter 300 (e.g., the aforementioned columnar screen holder 310, cleaning element 350, or wave wheel 370), thereby driving the columnar filtering screen 330 to rotate relative to the contents within the columnar filtering screen 330.

Referring further to FIGS. 39-40, the drain pipe 435b may be communicated with the drive fluid cavity 437b and may further be communicated with the plane filter 200 or the columnar filtering screen 330 for discharging water from the drive fluid cavity 437b onto the plane filter 200 or into the columnar filtering screen 330. The water wheel housing mechanism 430b to drive the rotation may save the energy consumption of the filtering device 10.

In the above embodiments, the filtering device 10 includes both a plane filter 200 and a rotary filter 300 to filter the water through the plane filter 200 and the rotary filter 300. However, in other embodiments, it may be possible to provide only the plane filter 200, or only the rotary filter 300, as long as the filtration performance requirements can be met.

Figure 42:
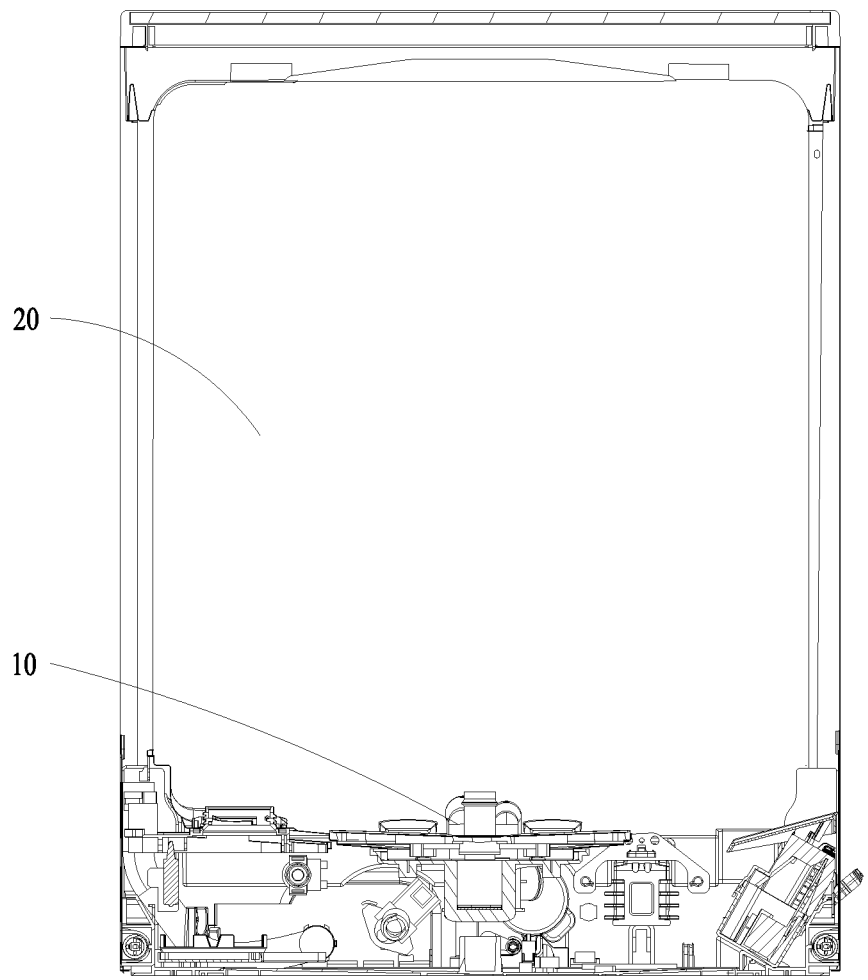
FIG. 42 is a schematic view of a partial structure of a tableware washing apparatus according to an embodiment of the present disclosure.

Embodiments of the present disclosure further provide a tableware washing apparatus. Referring to FIG. 42, the tableware washing apparatus substantially includes a filtering device 10, an inner liner 20, and a spray arm as described in any of the above embodiments. In particular, the inner liner 20 is configured to define a washing chamber for receiving the dishes to be washed. Both the filtering device 10 and the spray arm are accommodated in the inner liner 20, and a spray arm adapter 500 of the filtering device 10 is further connected to the spray arm. The filtering device 10 is arranged on an outer surface of the bottom of the inner liner 20 for collecting the washing water flowing from the washing chamber, filtering the washing water, and after filtering, delivering the filtered water to the inner liner again through the pumping action of a pump through the spray arm.

Specifically, when the washing water (to-be-filtered water) falls into the filtering device 10 from the inner liner, it first enters the plane filter 200. A portion of the water falls directly into the return chamber 123a between the cup 120 and the columnar filtering screen 330 through the tray 110. The rest of the water falls into the columnar filtering screen 330 through the first opening 250a in the middle of the plane filter 200, and discharged into the return chamber 123a after filtered by the columnar filtering screen 330. The filtered water in the return chamber 123a is discharged through the outlet pipe 150 and transported to the spray arm interface 113 by the pumping action of the pump, and enters the spray arm adapter 500, which can be sprayed into the inner liner again by the action of the spray arm.

With the filtering device 10 and the tableware washing apparatus of the present disclosure, while increasing the filtration area and the filtering speed, it is possible to reduce the possibility of blocking the flow of water caused by the residue gathering on the filtering screen in the direction of the flow of water, and thus increase the water volume of the tableware washing apparatus when the water filtered by the filtration system is pumped out to the inner liner. Therefore, the performance and filtering effect of the filtering device 10 can be improved, thus reducing the washing time or the water used for a single washing, and achieving energy saving and consumption reduction.

The above is only some embodiments of the present disclosure, not to limit the scope of the present disclosure. Any equivalent structure or equivalent process transformation made by using the content of the specification and the attached drawings of the present disclosure, or applied directly or indirectly in other related technical fields, are included in the scope of the present disclosure.

What is claimed is:

1. A filtering device for a tableware washing apparatus, comprising:
   a rotary filter comprising a columnar filtering screen configured to filter water from a washing process of the tableware washing apparatus, wherein a diameter of an external circle defined by each mesh of the columnar filtering screen is between 0.2 to 0.5 mm; and
   a drive assembly, connected to the rotary filter and configured to drive the columnar filtering screen to rotate relative to contents within the columnar filtering screen at a relative speed of 100 to 1000 r/min, configured to separate at least a portion of a residue on the columnar filtering screen from the columnar filtering screen, wherein the rotary filter further comprises a cleaning element, and the cleaning element is in contact with an inner wall of the columnar filtering screen; and
   the drive assembly is connected to the cleaning element and configured to drive the cleaning element to rotate relative to the columnar filtering screen to separate at least a portion of the residue from the columnar filtering screen by rotating the cleaning element; and
   wherein the cleaning element comprises: a mounting bracket connected to the drive assembly and rotatable by the drive assembly; and a contact portion arranged on the mounting bracket and in contact with the inner wall of the columnar filtering screen, and wherein a height of the contact portion is between 40 to 60 mm, and a width of the contact portion is between 0.9 to 1.1 mm.

2. The filtering device according to claim 1, wherein the rotary filter further comprises a columnar screen holder, and the columnar filtering screen is fixed on the columnar screen holder; and
   the drive assembly is connected to the columnar screen holder and further configured to drive the columnar screen holder to rotate the columnar filtering screen relative to the water within the columnar filtering screen, to separate at least a portion of the residue from the columnar filtering screen by rotating the columnar filtering screen.

3. The filtering device according to claim 1, wherein the drive assembly comprises a motor;
   the cleaning element comprises:
     a mounting bracket, comprising:
       a connection portion, coaxially disposed with the motor and rotatable under drive of the motor; and a shelf portion, wherein a side of the shelf portion is connected to the connection portion; and
a contact portion, arranged on another side of the shelf portion away from the connection portion and in contact with the inner wall of the columnar filtering screen.

4. The filtering device according to claim 1, wherein the rotary filter further comprises a wave wheel rotatably accommodated within the columnar filtering screen; and
the drive assembly is connected to the wave wheel and configured to drive the wave wheel to rotate relative to the columnar filtering screen to stir the water within the columnar filtering screen to separate at least a portion of the residue from the columnar filtering screen.

5. The filtering device according to claim 1, wherein a mesh count of meshes of the columnar filtering screen is between 50 to 70 mesh.

6. A filtering device for a tableware washing apparatus, comprising:
a rotary filter comprising a columnar filtering screen configured to filter water from a washing process of the tableware washing apparatus, wherein a diameter of an external circle defined by each mesh of the columnar filtering screen is between 0.2 to 0.5 mm; and
a drive assembly, connected to the rotary filter and configured to drive the columnar filtering screen to rotate relative to contents within the columnar filtering screen at a relative speed of 100 to 1000 r/min, configured to separate at least a portion of a residue on the columnar filtering screen from the columnar filtering screen, further comprising a water cup assembly, wherein the water cup assembly comprises:
a cup, wherein the columnar filtering screen is accommodated in the cup, and the cup comprises a bottom surface; and
a drive accommodating portion, connected to the cup and configured to accommodate at least a motor of the drive assembly;
wherein the drive accommodating portion does not protrude from the bottom surface of the cup along an axial direction of the cup; or
wherein the drive accommodating portion protrudes at least partially from the bottom surface of the cup along the axial direction of the cup, and a ratio of a protruding height of a bottom surface of the drive accommodating portion relative to the bottom surface of the cup to a height of the motor is less than 1:1.

7. The filtering device according to claim 1, further comprising a water cup assembly, wherein the water cup assembly comprises:
a cup, being columnar in shape, wherein the columnar filtering screen is accommodated in the cup;
an outlet pipe, connected to the cup; and
a discharge pump accommodating portion, communicated with the cup and configured to accommodate a discharge pump, to discharge residue within the cup by a pumping action of the discharge pump;
wherein the discharge pump accommodating portion is disposed on a side of the cup, and the outlet pipe is disposed on another side of the cup opposite to the side along a radial direction of the cup.

8. The filtering device according to claim 1, further comprising a cup columnar in shape, wherein the columnar filtering screen is accommodated in the cup, and a ratio of an inner diameter of the cup to an inner diameter of the columnar filtering screen is between 3:4 to 8:9; and a gap exists between an inner surface of the cup and an outer surface of the columnar filtering screen, and a width of the gap along a radial direction of the cup is between 10 to 20 mm.

9. The filtering device according to claim 8, wherein an inner diameter of the cup is 80 to 100 mm, and the inner diameter of the columnar filtering screen is 60 to 80 mm.

10. The filtering device according to claim 1, further comprising a water cup assembly, wherein the water cup assembly comprises:
a cup, wherein the columnar filtering screen is accommodated in the cup, and the cup comprises a bottom surface;
a drive accommodating portion, connected to the cup and configured to accommodate at least a motor of the drive assembly; and
the drive accommodating portion comprises:
a motor mounting part, configured to arrange the motor, wherein an output shaft of the motor is perpendicular to a radial direction of the cup;
a first fixing part, intersected with the motor mounting part and configured to arrange a first bevel gear and a first spur gear that are coaxially fixed, wherein the first bevel gear is engaged with a second bevel gear connected to the output shaft of the motor; and
a second fixing part, intersected with the first fixing part and disposed below the cup, wherein the second fixing part is configured to arrange a second spur gear, the second spur gear is engaged with the first spur gear, and an output shaft of the second spur gear is inserted into the cup from the bottom surface of the cup.

11. The filtering device according to claim 10, wherein an oil seal is arranged between the output shaft of the second spur gear and the cup.

12. The filtering device according to claim 1, further comprising a water cup assembly, wherein the water cup assembly comprises:
a cup, wherein the columnar filtering screen is accommodated in the cup, and the cup comprises a bottom surface;
a drive accommodating portion, connected to the cup and configured to accommodate at least a motor of the drive assembly; and
the drive assembly comprises:
a motor, arranged in the drive accommodating portion, wherein an output shaft of the motor is arranged along a radial direction of the cup and extends toward an outside of the drive accommodating portion;
an active wheel, arranged outside the drive accommodating portion and connected to the output shaft of the motor; and
a driven wheel, arranged outside the drive accommodating portion and in transmission connection with the active wheel, wherein an output shaft of the driven wheel is inserted into the cup from the bottom surface of the cup.

13. The filtering device according to claim 1, further comprising:
a tray, wherein a spray arm interface is arranged on the tray; and
at least two spray arm adapters, connected to the spray arm interface;
wherein the drive assembly comprises:
a water wheel housing, arranged on the tray and defining a drive fluid cavity, wherein the drive fluid cavity is communicated with one of the at least two spray arm adapters, such that water delivered to the one of the at least two spray arm adapters enters the drive fluid cavity;

a water wheel, accommodated in the drive fluid cavity and rotatable under drive of a force exerted on the water wheel by the water entering the drive fluid cavity, wherein the water wheel is connected to at least a portion of the rotary filter for driving the columnar filtering screen to rotate relative to the contents within the columnar filtering screen; and a drain pipe, communicated with the drive fluid cavity and the columnar filtering screen for discharging water from the drive fluid cavity into the columnar filtering screen.

14. A filtering device for a tableware washing apparatus, comprising:

a rotary filter comprising a columnar filtering screen configured to filter water from a washing process of the tableware washing apparatus, wherein a diameter of an external circle defined by each mesh of the columnar filtering screen is between 0.2 to 0.5 mm; and a drive assembly, connected to the rotary filter and configured to drive the columnar filtering screen to rotate relative to contents within the columnar filtering screen at a relative speed of 100 to 1000 r/min, configured to separate at least a portion of a residue on the columnar filtering screen from the columnar filtering screen, further comprising:

a plane filter, connected to the rotary filter and comprising:

a face-shaped screen holder, defining a first opening, wherein the columnar filtering screen is disposed below the face-shaped screen holder and facing the first opening, for allowing the water to fall from the first opening into the columnar filtering screen below the face-shaped screen holder; and a first face-shaped screen and a second face-shaped screen arranged side by side in a first direction, wherein an area of the first face-shaped screen is greater than an area of the second face-shaped screen, a first angle is formed between the first face-shaped screen and a reference plane perpendicular to an axial direction of the first opening, and a second angle is formed between the second face-shaped screen and the reference plane, the first angle being less than the second angle.

15. The filtering device according to claim 14, wherein the first angle and the second angle are set such that a distance from an outer edge of the first face-shaped screen away from the second face-shaped screen along the first direction and/or a second direction to the reference plane along the axial direction of the first opening is the same as a distance from an outer edge of the second face-shaped screen away from the first face-shaped screen along the first direction and/or the second direction to the reference plane along the axial direction of the first opening, the second direction being perpendicular to the first direction.

16. The filtering device according to claim 14, further comprising a cup, wherein the columnar filtering screen is accommodated in the cup, and the face-shaped screen holder comprises:

an outer frame;

an inner frame, embedded within the outer frame and facing the first opening; and at least one support rib, connected between the outer frame and the inner frame, wherein edges of the first face-shaped screen and the second face-shaped screen abut against the outer frame, the inner frame, and the at least one support rib, respectively;

wherein the rotary filter further comprises a columnar screen holder arranged in the cup, and the columnar filtering screen is fixed on the columnar screen holder; and the columnar screen holder is integrally molded with the inner frame or rotatably connected to the inner frame.

17. The filtering device according to claim 1, further comprising:

a cup, comprising a peripheral wall, wherein the peripheral wall encloses a receiving cavity for receiving the columnar filtering screen, and the peripheral wall defines a first water outlet; and an outlet pipe, connected to the cup, wherein an end of the outlet pipe is connected to the cup and communicated with the receiving cavity through the first water outlet, and the other end of the outlet pipe defines a second water outlet, the outlet pipe defines an outlet channel;

wherein a cross-sectional area of the outlet channel decreases along a direction from the first water outlet to the second water outlet, and a ratio of the cross-sectional area of the outlet channel at the first water outlet to the cross-sectional area of the outlet channel at the second water outlet is between 1.63 to 1.99.

18. The filtering device according to claim 1, further comprising a cup, wherein the cup comprises:

a bottom wall; and a peripheral wall, connected to a side of the bottom wall, wherein the peripheral wall encloses a receiving cavity for receiving the columnar filtering screen, and the peripheral wall defines a first water outlet; and wherein a recess is defined on a side of the bottom wall toward the receiving cavity, and the recess is arranged adjacent to and communicated with the first water outlet.

* * * * *